United States Patent
Ishino

(10) Patent No.: US 8,716,995 B2
(45) Date of Patent: May 6, 2014

(54) CONTROL CIRCUIT FOR SWITCHING POWER SUPPLY

(75) Inventor: Tsutomu Ishino, Kyoto (JP)

(73) Assignee: Rohm Co., Ltd. (JP)

( * ) Notice: Subject to any disclaimer, the term of this patent is extended or adjusted under 35 U.S.C. 154(b) by 335 days.

(21) Appl. No.: 13/298,695

(22) Filed: Nov. 17, 2011

(65) Prior Publication Data

US 2012/0126768 A1    May 24, 2012

(30) Foreign Application Priority Data

Nov. 24, 2010  (JP) ................. 2010-261638
Nov. 24, 2010  (JP) ................. 2010-261639
May 31, 2011   (JP) ................. 2011-122622
Sep. 28, 2011  (JP) ................. 2011-213323

(51) Int. Cl.
    *G05F 1/00*    (2006.01)
(52) U.S. Cl.
    USPC .......................................... 323/282
(58) Field of Classification Search
    USPC ......... 323/222, 224–226, 268, 269, 271–274, 323/282–285
    See application file for complete search history.

(56) References Cited

FOREIGN PATENT DOCUMENTS

| JP | 6-6969 A | 1/1994 |
|----|----------|--------|
| JP | 7-222438 A | 8/1995 |
| JP | 9-266664 A | 10/1997 |
| JP | 10-108457 A | 4/1998 |
| JP | 2005-261009 A | 9/2005 |
| JP | 2008-172909 A | 7/2008 |

*Primary Examiner* — Adolf Berhane
*Assistant Examiner* — Yemane Mehari
(74) *Attorney, Agent, or Firm* — Cantor Colburn LLP

(57) ABSTRACT

An error amplifier generates an error signal $V_{ERR}$ that corresponds to the difference between a feedback signal $V_{FB}$ and a predetermined reference voltage $V_{REF}$. A first oscillator generates a first cyclic signal $V_{OSC1}$ having a sloping segment and a first frequency. A second oscillator generates a second cyclic signal $V_{OSC2}$ having a sloping segment and a second frequency that is lower than the first frequency. A first pulse modulator generates a first pulse signal having a pulse width that corresponds to the error signal $V_{ERR}$, and clamps its pulse width such that it does not become smaller than a first minimum pulse width. A second pulse modulator generates a second pulse signal having a pulse width that corresponds to the error signal $V_{ERR}$. A synthesizing unit combines the first pulse signal and the second pulse signal so as to generate a driving pulse signal.

36 Claims, 14 Drawing Sheets

CONTROL CIRCUIT FOR SWITCHING POWER SUPPLY

BACKGROUND OF THE INVENTION

1. Field of the Invention

The present invention relates to a switching power supply.

2. Description of the Related Art

In order to generate a voltage higher or lower than the input voltage, a switching power supply is employed. The switching power supply includes an output inductor, an output capacitor, a switching transistor, and a control circuit configured to control the on/off operation of the switching transistor.

In some cases, in order to improve the efficiency when the switching power supply load becomes light, the frequency at which the on/off state of the switching element is switched, i.e., the switching frequency, is reduced. Such an arrangement provides an advantage of reduced loss due to the on resistance of a switching element, reduced loss due to the charging/discharging current that flows to/from the gate capacitance of the switching element, and reduced loss due to an rectifier element.

RELATED ART DOCUMENTS

Patent Documents

[patent document 1]
Japanese Patent Application Laid Open No. H09-266664
[patent document 2]
Japanese Patent Application Laid Open No. H06-006969
[patent document 3]
Japanese Patent Application Laid Open No. H10-108457
[patent document 4]
Japanese Patent Application Laid Open No. 2008-172909
[patent document 5]
Japanese Patent Application Laid Open No. 2005-261009
[patent document 6]
Japanese Patent Application Laid Open No. H07-222438

1. However, in some cases, when the switching frequency is reduced into the audible band, on the order of 20 Hz to 20 kHz as the load becomes light, it can be perceived by the user of a set (electronic device) mounting such a switching power supply as acoustic noise, which is a problem. Furthermore, even if such a switching operation of the switching power supply cannot be heard as acoustic noise, in some cases, fluctuation in the switching frequency is problematic.

2. A switching transistor included in the switching power supply is required to have three kinds of performance having a trade-off problem, i.e., high breakdown voltage, low on resistance, and low leak current. Typically, a MOSFET (Metal Oxide Semiconductor Field Effect Transistor) having a low leak current and low on resistance has a problem of low breakdown voltage. Accordingly, it is difficult to employ such a MOSFET in a step-up switching power supply. If a high breakdown voltage switching element is employed as such a switching transistor, this leads to a problem of high on resistance. If the gate threshold voltage of the switching transistor is reduced, such an arrangement provides an advantage of low on resistance. However, this leads to an increased leak current, resulting in a problem of low efficiency when the load becomes light.

SUMMARY OF THE INVENTION

1. The present invention has been made in order to solve such a problem. Accordingly, it is an exemplary purpose of an embodiment of the present invention to provide a switching power supply having a stable switching frequency in a light load state.

2. Also, it is another exemplary purpose of another embodiment of the present invention to provide a switching power supply having an improved balance between high breakdown voltage, low on resistance, and low leak current.

1. An embodiment of the present invention relates to a control circuit for a step-up, a step-down, or otherwise a step-up/step-down switching power supply comprising a switching element. The control circuit comprises: an error amplifier configured to generate an error signal that corresponds to the difference between a feedback signal which represents an electrical state of the switching power supply and a predetermined reference voltage; a first oscillator configured to generate a first cyclic signal having a first frequency; a second oscillator configured to generate a second cyclic signal having a sloping segment and having a second frequency that is lower than the first frequency; a first pulse modulator configured to generate, based upon a signal that corresponds to the error signal and the first frequency signal, a first pulse signal having the first frequency and having a pulse width that corresponds to the error signal, and to clamp the pulse width of the first pulse signal such that it does not become smaller than a predetermined first minimum pulse width which is a lower limit value; a second pulse modulator configured to compare the signal that corresponds to the error signal with the second cyclic signal so as to generate a second pulse signal having a pulse width that corresponds to the error signal; a synthesizing unit configured to combine the first pulse signal and the second pulse signal so as to generate a driving pulse signal; and a driver configured to drive the switching element according to the driving pulse signal.

In the heavy load state, the pulse width of the first pulse signal is adjusted. In the light load state, the pulse width of the first pulse signal is fixed to the first minimum pulse width. Furthermore, in the light load state, the pulse width of the second pulse signal is changed according to the load, which masks the first pulse signal. As a result, such an arrangement is capable of reducing the number of pulses in the light load state, thereby providing improved efficiency. Furthermore, such an arrangement is capable of maintaining the switching frequency at the second frequency, which is a fixed value.

Also, the first pulse modulator may be configured to reduce the pulse width of the first pulse signal according to the error signal becoming smaller, and to clamp the pulse width of the first pulse signal to the first minimum pulse width, which is a lower limit value, when the error signal becomes smaller than a predetermined threshold level. Also, the second pulse modulator may be configured to reduce the pulse width of the second pulse signal according to the error signal becoming smaller in a state in which the pulse width of the first pulse signal is clamped.

Also, the first cyclic signal may have a sloping segment that changes between a first lower limit level and a first upper limit level that is higher than the first lower limit level. Also, the second cyclic signal may change between a second lower limit level that is lower than the first lower limit level and a second upper limit level that is higher than the second lower limit level. Also, the first pulse modulator may be configured to compare the error signal with the first cyclic signal so as to generate the first pulse signal. Also, the second pulse modulator may be configured to compare the error signal with the second cyclic signal so as to generate the second pulse signal.

Also, the second upper limit level may be set to be higher than the first lower limit level. Such an arrangement is capable of preventing a dead band from occurring.

Also, the first oscillator may comprise: a first capacitor; and a first charging/discharging circuit configured to start discharging when the voltage at the first capacitor reaches the first upper limit level, and to start charging when the voltage at the first capacitor reaches the first lower limit level. Also, the first oscillator may be configured to output the voltage at the first capacitor as the first cyclic signal, and to output a synchronization clock having a level that transits according to the state of the charging/discharging circuit being switched between a charging state and a discharging state. Also, the second oscillator may comprise: a second capacitor; a frequency divider configured to divide the frequency of the synchronization clock; and a second charging/discharging circuit configured to charge and discharge the second capacitor in synchronization with the synchronization clock thus frequency divided. Also, the second oscillator may be configured to output the voltage at the second capacitor as the second cyclic signal.

Also, the second oscillator may be configured to generate the second cyclic signal that has a slope during a period of the first minimum pulse width of the first pulse signal, and that is flat during other periods.

Such an arrangement is capable of preventing a dead band from occurring.

Also, the first pulse modulator may comprise: a comparator configured to compare a current detection signal that corresponds to a current that flows through an inductor included in the switching power supply with the error signal, and to generate a set pulse; and an SR flip-flop arranged such that the set pulse is input to its set terminal, and the first cyclic signal is input to its reset terminal.

Also, the synthesizing unit may be configured to generate the driving pulse signal by further combining a signal obtained by combining the first pulse signal and the second pulse signal with a third pulse signal having a second minimum pulse width that is smaller than the first minimum pulse width.

Another embodiment of the present invention relates to a switching power supply. The switching power supply comprises: a switching transistor; an output circuit comprising an inductor element connected to the switching transistor, an output capacitor, and a rectifier element; and a control circuit according to any one of the aforementioned embodiments, configured to drive the switching transistor.

Yet another embodiment of the present invention relates to an electronic device. The electronic device comprises the aforementioned switching power supply.

2. Another embodiment of the present invention relates to a control circuit for a switching power supply configured to step down or otherwise to boost an input voltage applied to its input terminal, and to output, via its output terminal, an output voltage that is stabilized to a predetermined target value. The control circuit comprises: a first switching transistor and a second switching transistor sequentially arranged in series between one terminal of an inductor element included in the switching power supply and a fixed voltage terminal; a driving pulse signal generating unit configured to generate a driving pulse signal having a duty ratio that is adjusted such that the output voltage approaches the target value; a first driver configured to perform on/off switching of the first switching transistor according to the driving pulse signal; and a second driver configured to turn on the second switching transistor during at least a period in which the first switching transistor is on. The first switching transistor is configured to have a breakdown voltage that is higher than that of the second switching transistor.

With such an embodiment, such a first switching transistor ensures that the control circuit has a sufficient breakdown voltage. Furthermore, such a second switching transistor ensures that the control circuit has a low leak current.

Also, the first switching transistor may be configured as a soft enhancement mode or depletion mode MOSFET (Metal Oxide Semiconductor Field Effect Transistor).

Also, the first driver may be configured to turn on the first switching transistor after the second switching transistor is turned on. Also, the second driver may be configured to turn off the second switching transistor after the first switching transistor is turned off.

Also, the first driver may be configured to drive the first switching transistor according to a gate signal of the second switching transistor and the driving pulse signal. Also, the second driver may be configured to drive the second switching transistor according to a gate signal of the first switching transistor.

Also, the pulse signal generating unit may comprise: an error amplifier configured to generate an error signal that corresponds to the difference between a feedback signal which represents an electrical state of the switching power supply and a predetermined reference voltage; a first oscillator configured to generate a first cyclic signal having a sloping segment and a first frequency; a second oscillator configured to generate a second cyclic signal having a sloping segment and a second frequency that is lower than the first frequency; a first pulse modulator configured to compare a signal that corresponds to the error signal with the first cyclic signal so as to generate a first pulse signal having a pulse width that corresponds to the error signal, and to clamp the pulse width of the first pulse signal such that it does not become smaller than a predetermined first minimum pulse width; a second pulse modulator configured to compare a signal that corresponds to the error signal with the second cyclic signal so as to generate a second pulse signal having a pulse width that corresponds to the error signal; and a synthesizing unit configured to combine the first pulse signal and the second pulse signal so as to generate the driving pulse signal. Also, the first driver may be configured to perform switching of the first switching transistor according to the driving pulse signal. Also, the second driver may be configured to perform switching of the second switching transistor according to the second pulse signal.

Also, the second driver may be configured to perform switching of the second switching transistor according to the driving pulse signal.

Also, the control circuit may be configured to be monolithically integrated on a single semiconductor substrate.

Another embodiment of the present invention relates to a switching power supply. The switching power supply comprises a control circuit according to any one of the aforementioned embodiments.

Yet another embodiment of the present invention relates to an electronic device. The electronic device comprises the aforementioned switching power supply.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B. Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

First Embodiment

Figure 1:
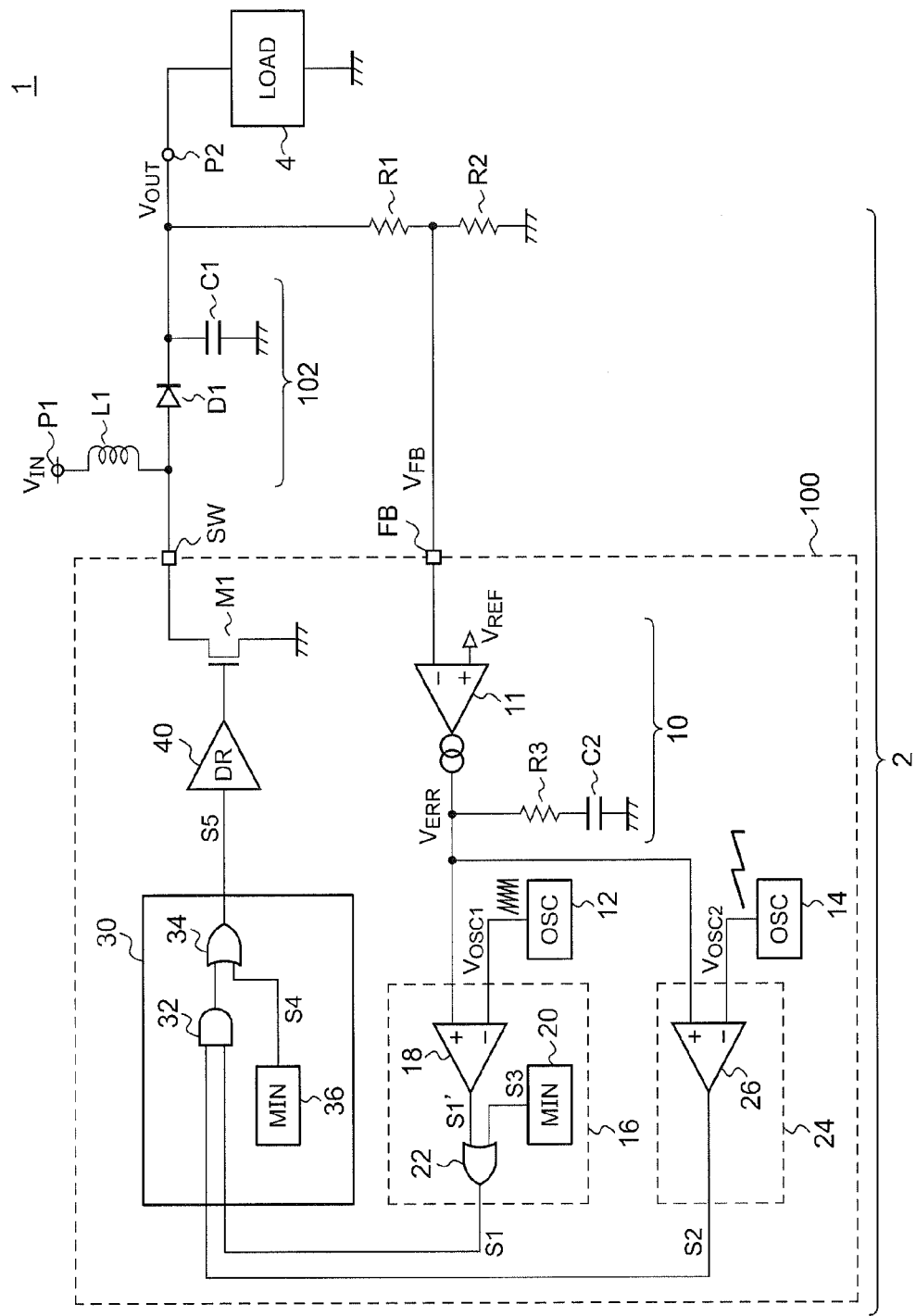
FIG. 1 is a circuit diagram which shows a configuration of an electronic device including a switching power supply according to a first embodiment.

FIG. 1 is a circuit diagram which shows a configuration of an electronic device 1 including a switching power supply 2 according to a first embodiment. The electronic device 1 is configured as a battery-driven device such as a cellular phone terminal, PDA (Personal Digital Assistant), portable audio player, digital still camera, or the like, and includes a switching power supply 2 and a load circuit 4. The switching power supply 2 is a step-up DC/DC converter configured to receive a DC input voltage $V_{IN}$ from an unshown battery or an AC adapter via its input terminal P1, to boost the input voltage $V_{IN}$ thus received, and to output the boosted voltage as an output voltage $V_{OUT}$ to the load circuit 4 connected to an output terminal P2. The load circuit 4 is configured as a circuit which requires a power supply voltage that is higher than the battery voltage. The configuration of the load circuit 4 is not restricted in particular.

The switching power supply 2 includes a switching transistor M1, an output circuit 102, and a control circuit 100. In FIG. 1, the switching transistor M1 is included in the control circuit 100 as a built-in component. Also, such a switching transistor M1 may be arranged as an external component.

The switching power supply 2 is a voltage-mode DC/DC converter configured to stabilize the output voltage $V_{OUT}$ by means of feedback control. The output voltage $V_{OUT}$ is divided by resistors R1 and R2, and the voltage thus divided is input to a feedback (FB) terminal of the control circuit 100 as a detection signal $V_{FB}$ that corresponds to the output voltage $V_{OUT}$. The output voltage 102 includes an inductor L1, a rectifier element D1, and an output capacitor C1. The output circuit 102 is configured as a smoothing rectifier circuit employed in a typical step-up DC/DC converter. Thus, detailed description thereof will be omitted. Also, a synchronous rectifier transistor may be arranged instead of the rectifier element D1.

The switching transistor M1 is arranged between the ground terminal and a switching terminal SW to which one terminal of the inductor L1 is connected. The control circuit 100 is configured to perform switching of the switching transistor M1 such that the detection signal $V_{FB}$ that corresponds to the output voltage $V_{OUT}$, which is one of the electrical states of the switching power supply 2, approaches a predetermined reference value. Such an arrangement provides the stabilized output voltage $V_{OUT}$ regardless of the input voltage $V_{IN}$ and the state of the load circuit 4.

The control circuit 100 includes an error amplifier 10, a first oscillator 12, a second oscillator 14, a first pulse modulator 16, a second pulse modulator 24, a synthesizing unit 30, a second minimum pulse width signal generating unit 36, and a driver 40.

The error amplifier 10 generates an error signal $V_{ERR}$ that corresponds to the difference between a predetermined reference voltage $V_{REF}$ and the feedback voltage $V_{FB}$ that corresponds to the output voltage $V_{OUT}$, which is an electrical state of the switching power supply 2. The error amplifier 10 includes a gm amplifier 11, a capacitor C2, and a resistor R3, for example. The gm amplifier 11 generates an output current that corresponds to the difference between the feedback signal $V_{FB}$ and the reference voltage $V_{REF}$. The capacitor C2 is charged and discharged by the output current of the gm amplifier 11, thereby generating the error signal $V_{ERR}$. The resistor R3 and the capacitor C2 also provide a phase compensation function. When $V_{FB} > V_{REF}$, the voltage level of the error amplifier $V_{ERR}$ rises, and when $V_{FB} < V_{REF}$, the voltage level of the error amplifier $V_{ERR}$ falls.

The first oscillator 12 generates a first cyclic signal $V_{OSC1}$ having a cyclic slope segment. The frequency of the first cyclic signal $V_{OSC1}$ is set to a first frequency $f_1$. For example, the first frequency $f_1$ is set to a value which allows the switching power supply 2 to perform feedback control in a sure manner. The first cyclic signal $V_{OSC1}$ may have a triangular waveform or a sawtooth waveform.

The second oscillator 14 generates a second cyclic signal $V_{OSC2}$ having a cyclic slope segment. The frequency of the second cyclic signal $V_{OSC2}$ is set to a second frequency $f_2$ that is lower than the first frequency $f_1$. The second frequency $f_2$ is preferably set to a frequency that is higher than the 20 Hz to 20 kHz audible band. The second cyclic signal $V_{OSC2}$ may also have a triangular waveform or a sawtooth waveform.

The relation between the first frequency $f_1$ and the second frequency $f_2$ is preferably determined such that the first frequency $f_1$ is equal to an integer multiple of the second frequency $f_2$. More preferably, it is determined to be equal to a value obtained by multiplying the first frequency $f_1$ by $2^m$ (m represents an integer). This allows such an arrangement to generate either the first frequency $f_1$ or the second frequency $f_2$ in a simple manner by dividing or multiplying the other frequency. Description will be made in the present embodiment regarding an arrangement in which the first frequency $f_1$ is set to 400 kHz, and the second frequency $f_2$ is set to 400 kHz/16=25 kHz.

The first pulse modulator 16 is configured to generate a first pulse signal S1 by comparing a signal that corresponds to the error signal $V_{ERR}$ with the first cyclic signal $V_{OSC1}$. In FIG. 1, the error signal $V_{ERR}$ itself is used as such a signal that corresponds to the error signal $V_{ERR}$. Also, a signal obtained by level shifting, voltage dividing, or other signal processing of the error signal $V_{ERR}$ may be compared with the first cyclic signal $V_{OSC1}$.

The first pulse signal S1 has a pulse width (duty ratio) $\tau_1$ that changes according to the error signal $V_{ERR}$. That is to say, the first pulse signal S1 is subjected to pulse width modulation. Furthermore, the first pulse modulator 16 is configured to be capable of clamping the pulse width $\tau_1$ of the first pulse signal S1 to a first minimum pulse width $\tau_{MIN1}$.

Specifically, the first pulse modulator 16 includes a first comparator 18, a first minimum pulse width signal generating unit 20, and a first logical gate 22. The first comparator 18 is configured to compare the error signal $V_{ERR}$ with the first cyclic signal $V_{OSC1}$, and to generate a first intermediate pulse signal S1' which is set to high level when $V_{ERR}$ is greater than $V_{OSC1}$. As the error signal $V_{ERR}$ becomes smaller, the pulse width (duty ratio) of the first intermediate pulse signal S1' becomes shorter.

The first minimum pulse width signal generating unit 20 is configured to generate a first minimum pulse width signal S3 having the first frequency $f_1$ and the first minimum pulse width $\tau_{MIN1}$. The first logical gate 22 performs a logical operation on the first intermediate pulse signal S1' and the first minimum pulse width signal S3, and, specifically, generates the logical OR of these signals, so as to generate the first pulse signal S1. The pulse width $\tau_1$ of the first pulse signal S1 is clamped to the first minimum pulse width $\tau_{MIN1}$. Thus, such an arrangement prevents the first pulse signal S1 from having a pulse width that is lower than the first minimum pulse width $\tau_{MIN1}$.

The second pulse modulator 24 is configured to compare a signal that corresponds to the error signal $V_{ERR}$ with the second cyclic signal $V_{OSC2}$ so as to generate a second pulse signal S2 having a pulse width $\tau_2$ that corresponds to the error signal $V_{ERR}$. The second pulse modulator 24 includes a second comparator 26. The second comparator 26 is configured to compare the error signal $V_{ERR}$ with the second cyclic signal $V_{OSC2}$, and to generate a second pulse signal S2 which is set to high level when $V_{ERR}$ is greater than $V_{OSC2}$. As the error signal $V_{ERR}$ becomes smaller, the pulse width (duty ratio) $\tau_2$ of the second pulse signal S2 becomes shorter. That is to say, the second pulse signal S2 is also subjected to pulse width modulation.

The first pulse modulator 16 is configured to reduce the pulse width $\tau_1$ of the first pulse signal S1 according to a reduction in the error signal $V_{ERR}$. When the error signal $V_{ERR}$ becomes smaller than a predetermined threshold level Vth, the first pulse modulator 16 clamps the pulse width $\tau_1$ to the first minimum pulse width $\tau_{MIN1}$. On the other hand, in such a state in which the pulse width of the first pulse signal S1 is clamped, the second pulse modulator reduces the pulse width of the second pulse signal S2 according to a reduction in the error signal $V_{ERR}$.

In order to provide such an operation, the oscillator 12 is configured to generate the first cyclic signal $V_{OSC1}$ that is changed within a range between a first lower limit level $V_{L1}$ and a first upper limit level $V_{H1}$ that is higher than the first lower limit level. On the other hand, the second oscillator 14 is configured to generate the second cyclic signal $V_{OSC2}$ that is changed within a range between a second lower limit level $V_{L2}$ that is lower than the first lower limit level $V_{L1}$ and a second upper limit level $V_{H2}$ that is higher than the second lower limit level $V_{L2}$. The second lower limit level $V_{L2}$ is preferably set to a value that is higher than the lower limit (e.g., 0.2 V) of the output voltage range of the gm amplifier 11.

The first pulse modulator 16 is configured to compare the error signal $V_{ERR}$ with the first cyclic signal $V_{OSC1}$ so as to generate the first pulse signal S1. Furthermore, the second pulse modulator 24 is configured to compare the error signal $V_{ERR}$ with the second cyclic signal $V_{OSC2}$ so as to generate the second pulse signal S2.

The synthesizing unit 30 is configured to combine the first pulse signal S1 and the second pulse signal S2 so as to generate a driving pulse signal S5. Specifically, the synthesizing unit 30 masks the first pulse signal S1 using the second pulse signal S2, so as to generate the driving pulse signal S5. Furthermore, the synthesizing unit 30 is configured to clamp the pulse width of the driving pulse signal S5 such that it does not fall below a predetermined second minimum pulse width $\tau_{MIN2}$.

The synthesizing unit 30 includes a second logical gate 32, a third logical gate 34, and a second minimum pulse width signal generating unit 36. The second logical gate 32 is configured as an AND gate, and is configured to generate a signal S5' that corresponds to the logical AND of the first pulse signal S1 and the second pulse signal S2. The second minimum pulse width signal generating unit 36 is configured to generate a second minimum pulse width signal S4 having the second frequency $f_2$ and the second minimum pulse width $\tau_{MIN2}$. The third logical gate 34 generates the logical OR of the two signals S5' and S4, thereby clamping the pulse width of the driving pulse signal S5 such that it is equal to or greater than the second minimum pulse width $\tau_{MIN2}$.

The driver 40 is configured to drive the switching transistor M1 according to the driving pulse signal S5. As a result, the on/off duty ratio of the switching transistor M1 is adjusted such that the feedback signal $V_{FB}$ matches the reference voltage $V_{REF}$, thereby stabilizing the output voltage $V_{OUT}$.

The above is the configuration of the switching power supply 2 including the control circuit 100. Next, description will be made regarding the operation thereof.

Figure 2A:
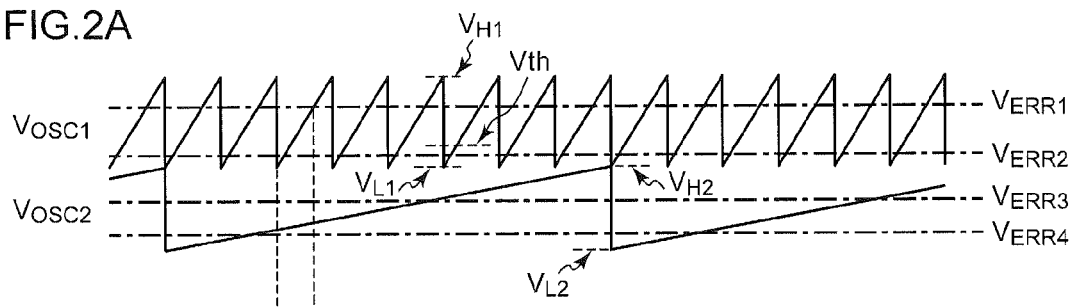
FIGS. 2A through 2E are time charts each showing the operation of the switching power supply shown in FIG. 1.

FIGS. 2A through 2E are time charts each showing the operation of the switching power supply 2 shown in FIG. 1. FIG. 2A shows the first cyclic signal $V_{OSC1}$, the second cyclic signal $V_{OSC2}$, and error signals $V_{ERR1}$ through $V_{ERR4}$ that each have various different levels. FIGS. 2B through 2E each show pulse waveforms for the respective error signals $V_{ERR1}$ through $V_{ERR4}$.

Figure 2B:
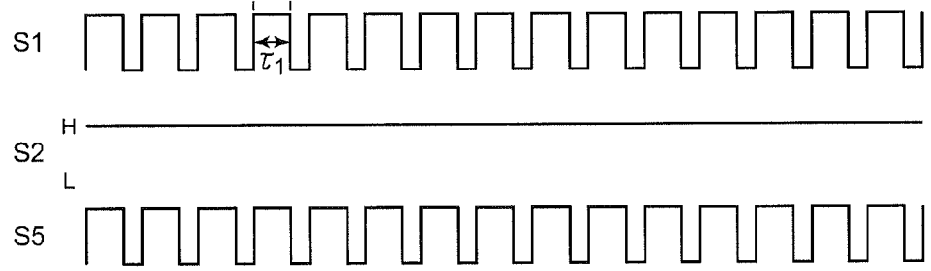

As shown in FIG. 2B, when the error signal $V_{ERR}$ is relatively large ($V_{ERR1}$), the first pulse signal S1 has a pulse width $\tau_1$ that corresponds to the error signal $V_{ERR}$. In this state in which $V_{ERR1} > V_{OSC2}$, the second pulse signal S2 is maintained at high level. As a result, the driving pulse signal S5 is configured as the same pulse signal as the first pulse signal S1.

Figure 2C:
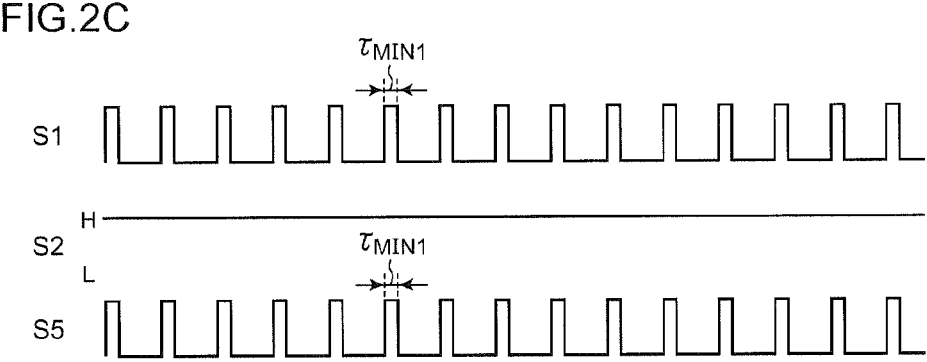

As the error signal $V_{ERR}$ becomes smaller, the pulse width $\tau_1$ of the first pulse signal S1 becomes shorter. When the error signal $V_{ERR}$ is lower than a predetermined level, the pulse width $\tau_1$ of the first pulse signal S1 is clamped to the first minimum pulse width $\tau_{MIN1}$. As shown in FIG. 2C, the second pulse signal S2 is maintained at high level for the error signal $V_{ERR2}$. In this case, the driving pulse signal S5 is configured as a pulse signal having the first minimum pulse width $\tau_{MIN1}$ and the frequency $f_1$.

Figure 2D:
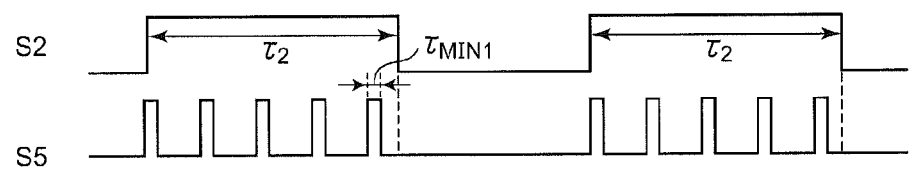

Referring to FIG. 2D, when the error signal $V_{ERR}$ becomes still smaller ($V_{ERR3}$), the pulse width $\tau_1$ of the first pulse signal S1 is clamped to the first minimum pulse width $\tau_{MIN1}$. Furthermore, the pulse width of the second pulse signal S2 is determined according to the error signal $V_{ERR}$. That is to say, the number of pulses included in the driving pulse signal S5 changes according to the error signal $V_{ERR}$.

Figure 2E:
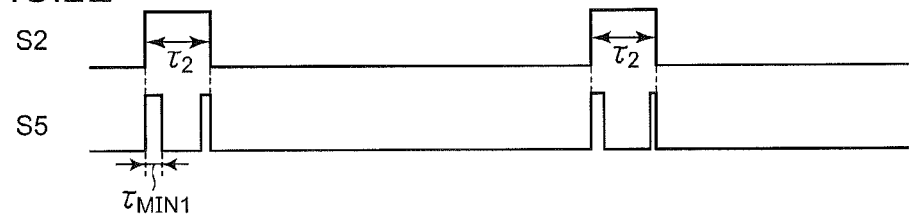

Referring to FIG. 2E, if the error signal $V_{ERR}$ becomes still smaller ($V_{ERR4}$), the pulse width $\tau_2$ of the second pulse signal S2 is reduced. In this case, the pulse width $\tau_1$ of the last pulse in each cycle of the driving pulse signal S5 is reduced according to a reduction in the pulse width $\tau_2$ of the second pulse signal S2, and the last pulse ultimately disappears. Thus, as the pulse width $\tau_2$ of the second pulse signal S2 becomes shorter, the number of pulses that remain in the driving pulse signal S5 in each high-level period of the second pulse signal S2 becomes smaller. Ultimately, only the first pulse remains in the driving pulse signal S5 in each high-level period of the second pulse signal S2. When the pulse width $\tau_2$ of the second pulse signal S2 becomes shorter than the first minimum pulse width $\tau_{MIN1}$ the pulse width of the driving pulse signal S5 is reduced. When the pulse width $\tau_2$ of the second pulse signal S2 is reduced to the second minimum pulse width $\tau_{MIN2}$, the pulse width $\tau_2$ of the second pulse signal S2 is clamped.

The above is the operation of the switching power supply 2.

With such a switching power supply 2, when the load is heavy, the operation is performed in the range $V_{L1} < V_{ERR} < V_{H1}$. In this case, the duty ratio of the first signal S1 is adjusted, and the switching transistor M1 is driven with the first frequency $f_1$.

As the load becomes lighter, the error signal $V_{ERR}$ becomes smaller, which reduces the duty ratio of the first pulse signal S1. When $V_{ERR}$ becomes smaller than Vth, switching of the switching transistor M1 is performed with the first minimum pulse width $\tau_1$.

As the load becomes even lighter, the driving operation is performed in the range $V_{L2} < V_{ERR} < V_{H2}$. The pulse width $\tau_2$ of the second pulse signal S2 is reduced according to a reduction in the load. In this case, a part of the first pulse signal S1 is masked, which reduces the effective on time of the switching transistor M1.

When the pulse width of the second pulse signal S2 is further reduced, ultimately only one pulse that corresponds to the first pulse of the first pulse signal S1 remains in the driving pulse signal S5, and the driving frequency of the switching transistor M1 becomes the same as the second frequency $f_2$. In this stage, the pulse width of the driving pulse signal S5 that corresponds to the first pulse is reduced to the second minimum pulse width $\tau_{MIN2}$. Thus, in a light load state, such an arrangement is capable of performing intermittent switching of the switching transistor M1 with an extremely short pulse.

That is to say, with such a switching power supply 2, even in a light load state, the switching frequency of the switching transistor M1 is clamped such that it does not become lower than the second frequency $f_2$. Thus, in the light load state, such an arrangement is capable of suppressing change in frequency, as compared with conventional switching power supplies configured to perform a driving operation in an intermittent mode (which is also referred to as a "pulse frequency modulation mode").

By setting the second frequency $f_2$ to a value that is higher than the audible band, such an arrangement is capable of suppressing the occurrence of acoustic noise.

The above are the basic configurations, operations, and advantages of the switching power supply 2. Next, description will be made regarding modifications thereof and specific example configurations thereof.

With such a switching power supply 2 shown in FIG. 1, a dead band could occur in which the effective on time of the driving pulse signal S5 does not change even if the error signal $V_{ERR}$ changes, which is undesirable from the point of view of system stability. Examples of problems that occur due to such a dead band include a problem of fluctuation in the number of pulses of the first pulse signal S1 contained in each period of the second pulse signal S2, due to fluctuation in the pulse width of the second pulse signal S2 in the light load state.

For example, FIG. 2A shows an arrangement in which the first lower limit level $V_{L1}$ is approximately equal to the second upper limit level $V_{H2}$. In this case, a dead band occurs in the range $V_{H2} < V_{ERR} < Vth$ in which the driving pulse signal S5 does not change even if the error signal $V_{ERR}$ changes. In order to prevent such a dead band from occurring, $V_{H2}$ may be preferably set to be greater than $V_{L1}$, and $V_{H2}$ may be preferably set to be approximately equal to Vth. With such an arrangement, when the error signal $V_{ERR}$ becomes smaller, and the pulse width of the first pulse signal S1 is clamped, the pulse width of the second pulse signal S2 is immediately reduced, thereby eliminating such a dead band.

Furthermore, it should be noted that a dead band occurs in the range $V_{L2} < V_{ERR} < V_{H2}$. That is to say, when a trailing edge (negative edge) of the second pulse signal S2 changes in a period in which the first pulse signal S1 is low level, a change in the error signal $V_{ERR}$ does not provide a change in the driving pulse signal S5. This problem can be solved by modifying the waveform of the second cyclic signal $V_{OSC2}$.

Figure 3:
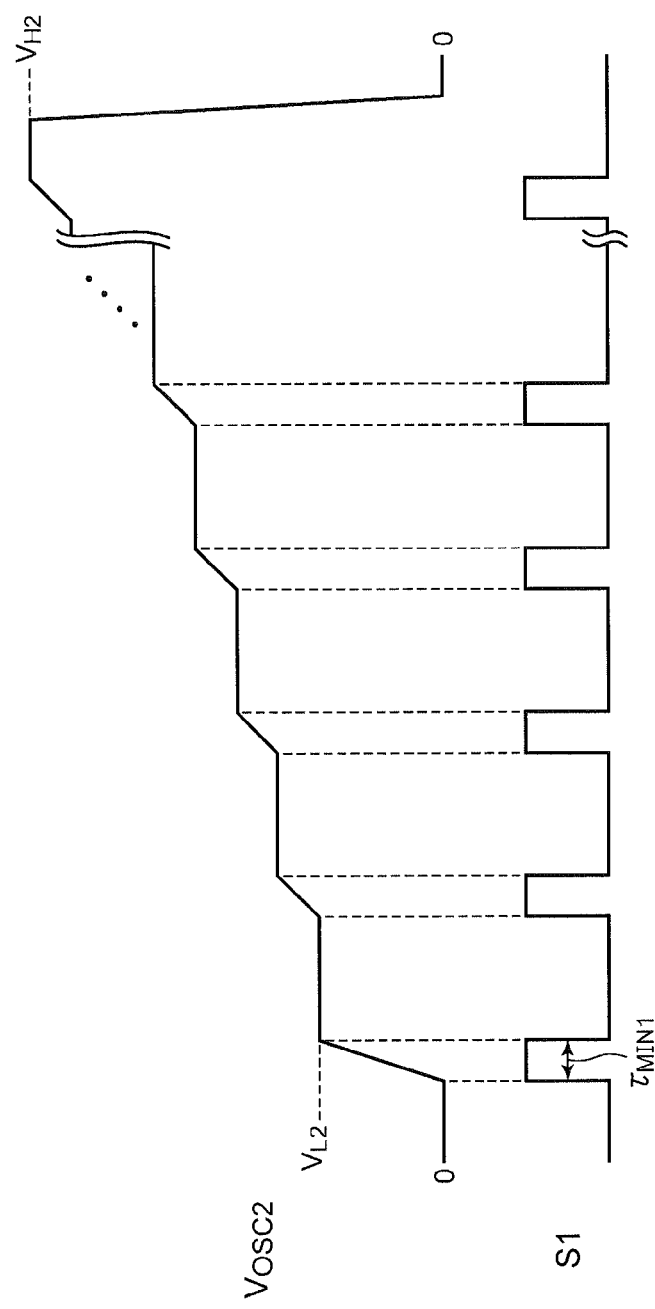
FIG. 3 is a waveform diagram showing a second frequency signal generated in order to eliminate a dead band.

FIG. 3 is a waveform diagram showing the second cyclic signal $V_{OSC2}$ designed so as to solve the problem of such a dead band. The second oscillator 14 generates the second cyclic signal $V_{OSC2}$ that has a slope in a period of the first minimum pulse width $\tau_{MIN1}$ in which the first pulse signal S1 is high level, and that is flat in the other periods. Such an arrangement is capable of eliminating such a dead band.

Figure 4:
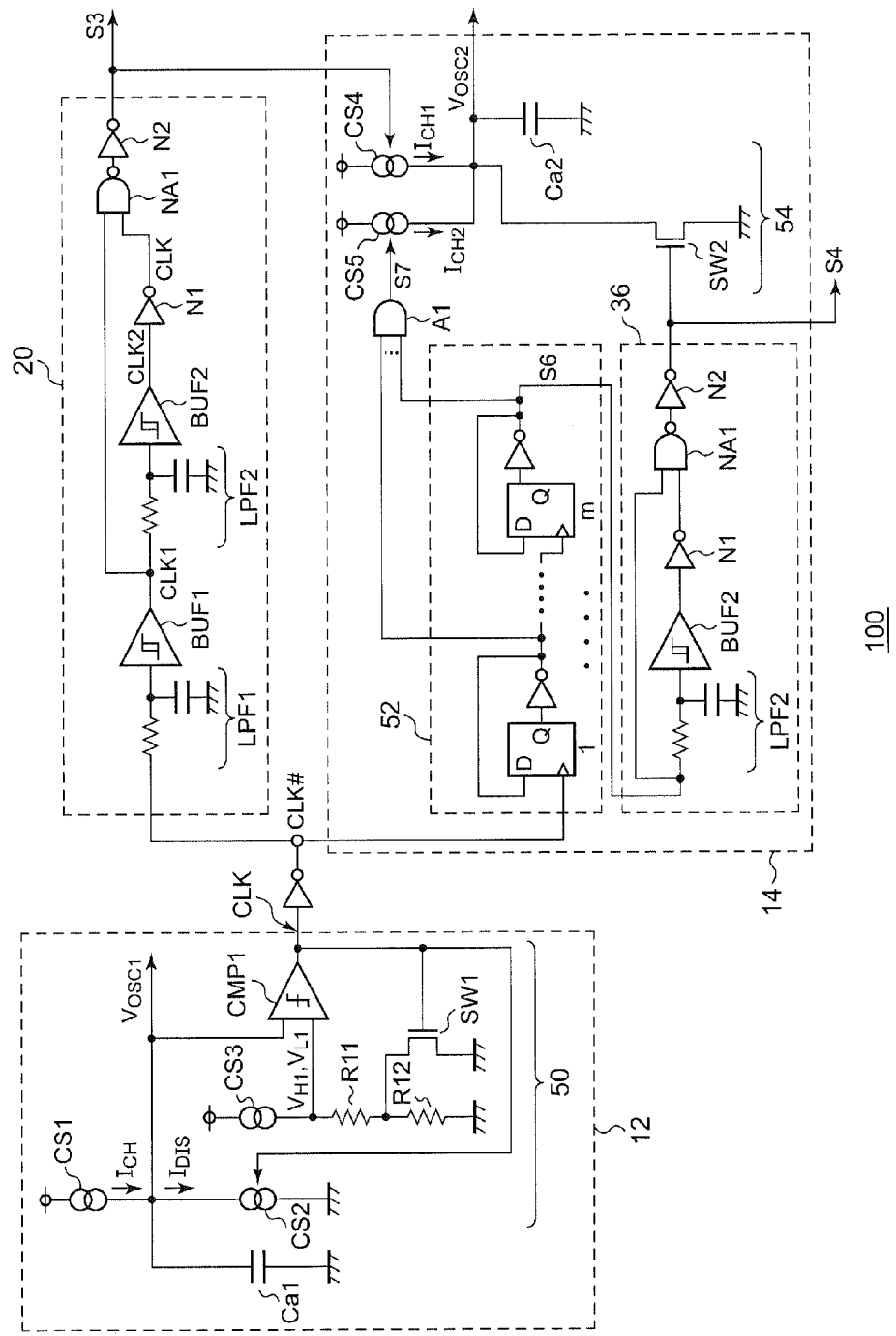
FIG. 4 is a circuit diagram showing a specific example configuration of a part of the control circuit.

FIG. 4 is a circuit diagram which shows a specific example configuration of a part of the control circuit 100. FIG. 4 shows the first oscillator 12, the second oscillator 14, the first minimum pulse width signal generating unit 20, and the second minimum pulse width signal generating unit 36, from among the components of the control circuit 100.

The first oscillator 12 includes a first capacitor Ca1 and a first charging/discharging circuit 50. One terminal of the first capacitor Ca1 is grounded. When the voltage $V_1$ at the first capacitor Ca1 reaches a first upper limit level $V_{H1}$, the first charging/discharging circuit 50 starts discharging, and when the voltage $V_1$ at the first capacitor Ca1 reaches a first lower limit level $V_{L1}$, the first charging/discharging circuit 50 starts charging. The first oscillator 12 outputs the voltage $V_1$ at the first capacitor Ca1 as the first cyclic signal $V_{OSC1}$.

The first charging/discharging circuit 50 includes current sources CS1, CS2, and CS3, a comparator CMP1, resistors R11 and R12, and a switch SW1. The current source CS1 supplies a charging current $I_{CH}$ to the first capacitor Ca1. The current source CS2 is configured to be switchable between an on state and an off state. In the on state, the current source CS2 discharges the first capacitor Ca1 with a discharging current $I_{DIS}$.

The current source CS3, the resistors R11 and R12, and the switch SW1 form a voltage source configured to generate the voltages $V_{L1}$ and $V_{H1}$. The current source CS3 is configured to generate a reference current $I_{REF}$. In the on state of the switch SW1, the first lower limit level $V_{L1}=V_{REF}\times R11$ is generated. In the off state of the switch SW1, the first upper limit level $V_{H1}=I_{REF}\times(R11+R12)$ is generated. The comparator CMP1 is configured to compare the voltage at the first capacitor Ca1 with the reference voltage $V_{L1}/V_{H1}$, and to switch the on/off state of the switch SW1 and the on/off state of the current source CS2 according to the comparison result.

Such a first oscillator 12 generates the first cyclic signal $V_{OSC1}$ having a sawtooth waveform with a peak level $V_{H1}$ and a bottom level $V_{L1}$.

The output signal (synchronization clock) CLK of the comparator CMP1 has a level that transits according to switching of the charging/discharging circuit (CS1 and CS2) between the charging state and the discharging state. The synchronization clock CLK is inverted by an inverter N3, and the synchronization clock CLK thus inverted is output to the first minimum pulse width signal generating unit 20 and the first charging/discharging circuit 50.

The first minimum pulse width signal generating unit 20 includes low-pass filters LPF1 and LPF2, a buffer BUF1, inverters N1 and N2, and a NAND gate NA1. The low-pass filter LPF1 performs filtering of the input synchronization clock CLK# ("#" represents logical inversion). The buffer BUF1 is a hysteresis buffer (Schmitt buffer) configured to receive the output of the low-pass filter LPF1. The low-pass filter LPF1 and the buffer BUF1 delay the synchronization clock CLK1 by the first minimum pulse width $\tau_{MIN1}$ so as to generate the synchronization clock CLK1.

Furthermore, the low-pass filter LPF2 and the buffer BUF2 delay the synchronization clock CLK1 so as to generate the synchronization clock CLK2. By generating the logical AND of the synchronization clock CLK1 and the inverted synchronization clock CLK2# obtained by inverting the synchronization clock CLK2, such an arrangement generates the first minimum pulse width signal S3 having the first minimum pulse width $\tau_{MIN1}$.

The second oscillator 14 includes a second capacitor Ca2, a frequency divider 52, and a second charging/discharging circuit 54. The frequency divider 52 divides the frequency of the synchronization clock CLK#. The frequency divider 52 includes m stages of ½ frequency dividers. In a case in which the frequency divider 52 includes four stages of such ½ frequency dividers, the frequency of the synchronization clock CLK# is divided by 16. That is to say, the frequency divider 52 outputs a pulse signal S6 having the second frequency $f_2$.

The second charging/discharging circuit 54 includes current sources CS4 and CS5, and a discharging switch SW2.

In the frequency divider 52, the m signals thus frequency divided at the respective stages pass through an AND gate A1. The AND gate A1 generates a pulse signal S7 which is asserted (set to high level) once every 16 pulses of the synchronization clock CLK#. The pulse signal S7 has the second frequency $f_2$ and the same pulse width as that of the synchronization clock CLK. When the pulse signal S7 is asserted, the current source CS5 is turned on, thereby charging the second capacitor Ca2. As a result of charging the second capacitor Ca2 using the current source CS5, the second cyclic signal $V_{OSC2}$ rapidly rises from 0 V up to the second lower limit level $V_{L2}$. The first lower limit level $V_{L2}$ is determined according to the charging current $I_{CH2}$ supplied from the current source CS5.

$$V_{L2}=\tau_{MIN1}\times I_{CH2}/Ca2$$

Subsequently, the current source CS4 is turned on every time the first minimum pulse width signal S3 is asserted (set to high level), which supplies the charging current $I_{CH1}$ to the second capacitor Ca2, thereby charging the second capacitor Ca2. The current value of the charging current $I_{CH1}$ determines the slope of the second and subsequent pulses of the second cyclic signal $V_{OSC2}$ shown in FIG. 3.

The second minimum pulse width signal generating unit 36 is configured similarly to the first minimum pulse width signal generating unit 20. The second minimum pulse width signal generating unit 36 receives the pulse signal S6 having the second frequency $f_2$, and generates the second minimum pulse width signal S4 having the second minimum pulse width $\tau_2$. The discharging switch SW2 is turned on every time the second minimum pulse width signal S4 is asserted, which discharges the second capacitor Ca2.

Such a second oscillator 14 shown in FIG. 4 is capable of generating the second cyclic signal $V_{OSC2}$ having such a slope with respect to each on period of the first minimum pulse width signal S3 as shown in FIG. 3.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

Description has been made in the embodiment regarding a step-up switching power supply. Also, the present invention can be applied to a step-down switching power supply, or to a step-up/step-down switching power supply. Also, the present invention can be applied to an insulating switching power supply including a transformer instead of the inductor L1.

Description has been made in the embodiment regarding an arrangement configured to be capable of clamping the pulse width of the driving pulse signal S5 to the predetermined second minimum pulse width $\tau_{MIN2}$ using the second minimum pulse width signal S4. From the point of view of reducing audible noise, the capability of clamping the pulse width of the driving pulse signal S5 to the second minimum pulse width $\tau_{MIN2}$ is more advantageous. However, in some cases, such noise is not perceptible even if such an arrangement does not have such a clamping function. In this case, the second minimum pulse width signal generating unit 36 and the third logical gate 34 can be omitted, thereby providing a reduced circuit area.

Description has been made in the embodiment regarding a voltage mode switching power supply. Also, the present invention can be applied to various kinds of switching power supplies employing different modes such as a peak current mode, an average current mode, etc. In this case, the configurations of the first pulse modulator 16 and the second pulse modulator 24 should be modified corresponding to the feedback method, which is readily conceived by those skilled in this art.

[First Modification]

Figure 5:
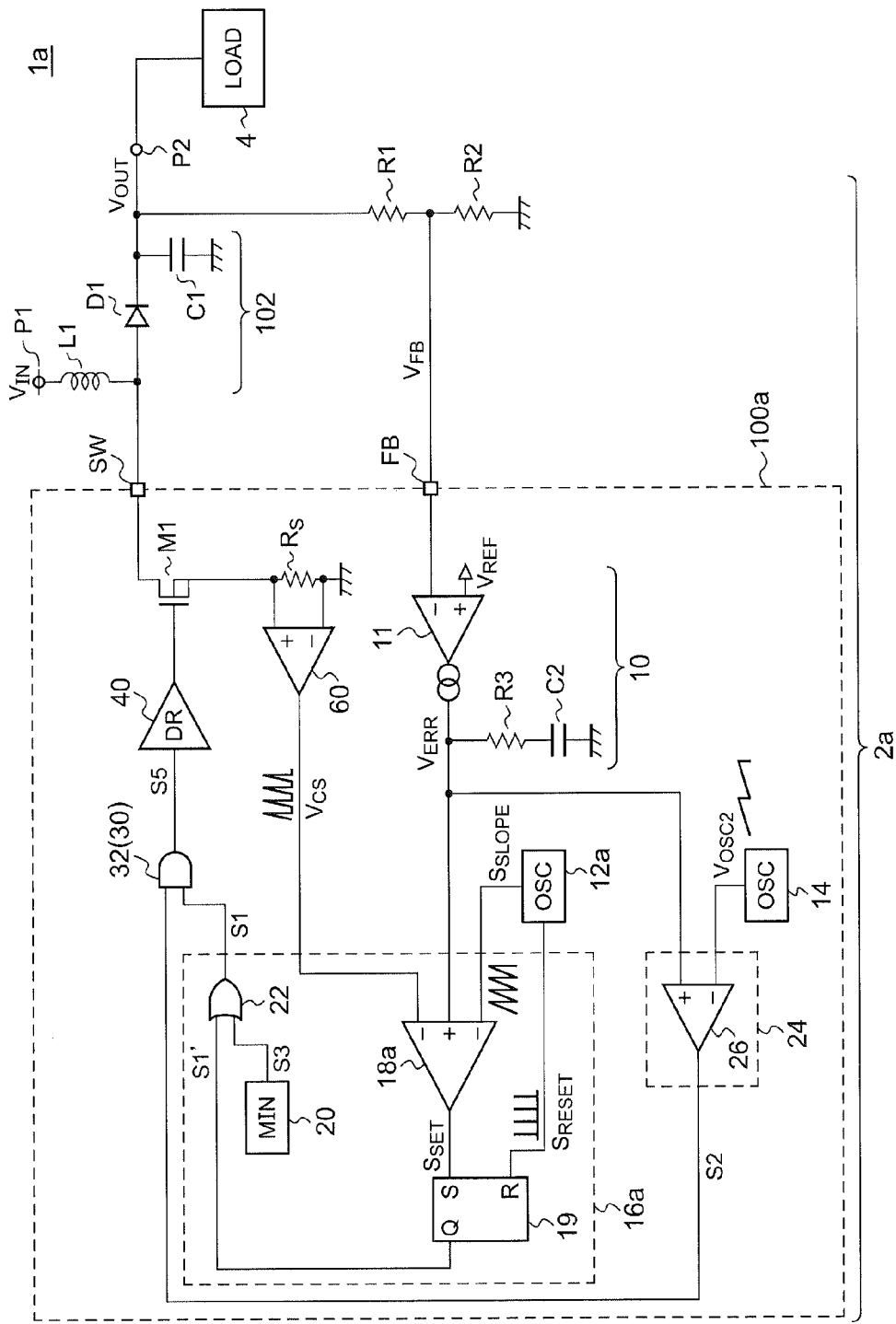
FIG. 5 is a circuit diagram which shows a configuration of a switching power supply according to a first modification.

FIG. 5 is a circuit diagram which shows a configuration of a switching power supply 2a according to a first modification. The switching power supply 2a includes a peak current mode control circuit 100a.

A detection resistor Rs is arranged between the source of the switching transistor M1 and the ground terminal. An amplifier 60 is configured to amplify a voltage drop that occurs at the detection resistor Rs so as to generate a current detection signal $V_{CS}$ that corresponds to a current that flows through the inductor L1. It should be noted that the method for generating the current detection signal $V_{CS}$ is not restricted to such an arrangement.

A first oscillator 12a is configured to generate a reset pulse $S_{RESET}$ having the first frequency $f_1$ and a slope signal $V_{SLOPE}$ used for phase compensation.

A first pulse modulator 16a is configured to generate the first pulse signal S1 having the first frequency $f_1$ and a pulse width that corresponds to the error signal $V_{ERR}$ based upon the reset pulse $S_{RESET}$ and the phase compensation slope signal $V_{SLOPE}$, and to be capable of clamping the pulse width of the first pulse signal S1 to the predetermined first minimum pulse width $\tau_{MIN1}$.

A first comparator 18a is configured to compare a signal obtained by superimposing the slope signal $V_{SLOPE}$ on the current detection signal $V_{CS}$ with the error signal $V_{ERR}$, and to generate a set pulse $S_{SET}$ that corresponds to the comparison result.

An SR flip-flop 19 is arranged such that the set pulse $S_{SET}$ is input to its set terminal, the reset pulse $S_{RESET}$ is input to its reset terminal from the first oscillator 12a, and a pulse width modulated signal S1' is output from its output terminal.

With such a switching power supply 2a shown in FIG. 5, such an arrangement provides the same advantages as those of the switching power supply 2 shown in FIG. 1.

The present invention can be applied to various kinds of switching regulators employing an average current mode, a fixed on period mode, a fixed off period mode, etc., which are readily conceived by those skilled in this art.

It should be noted that the control circuit 100a shown in FIG. 5 may include the second minimum pulse width signal generating unit 36 and the third logical gate 34 as additional components, which provides a function of clamping the pulse width of the driving pulse signal S5 to the second minimum pulse width $\tau_{MIN2}$.

[Second Modification]

Figure 6:
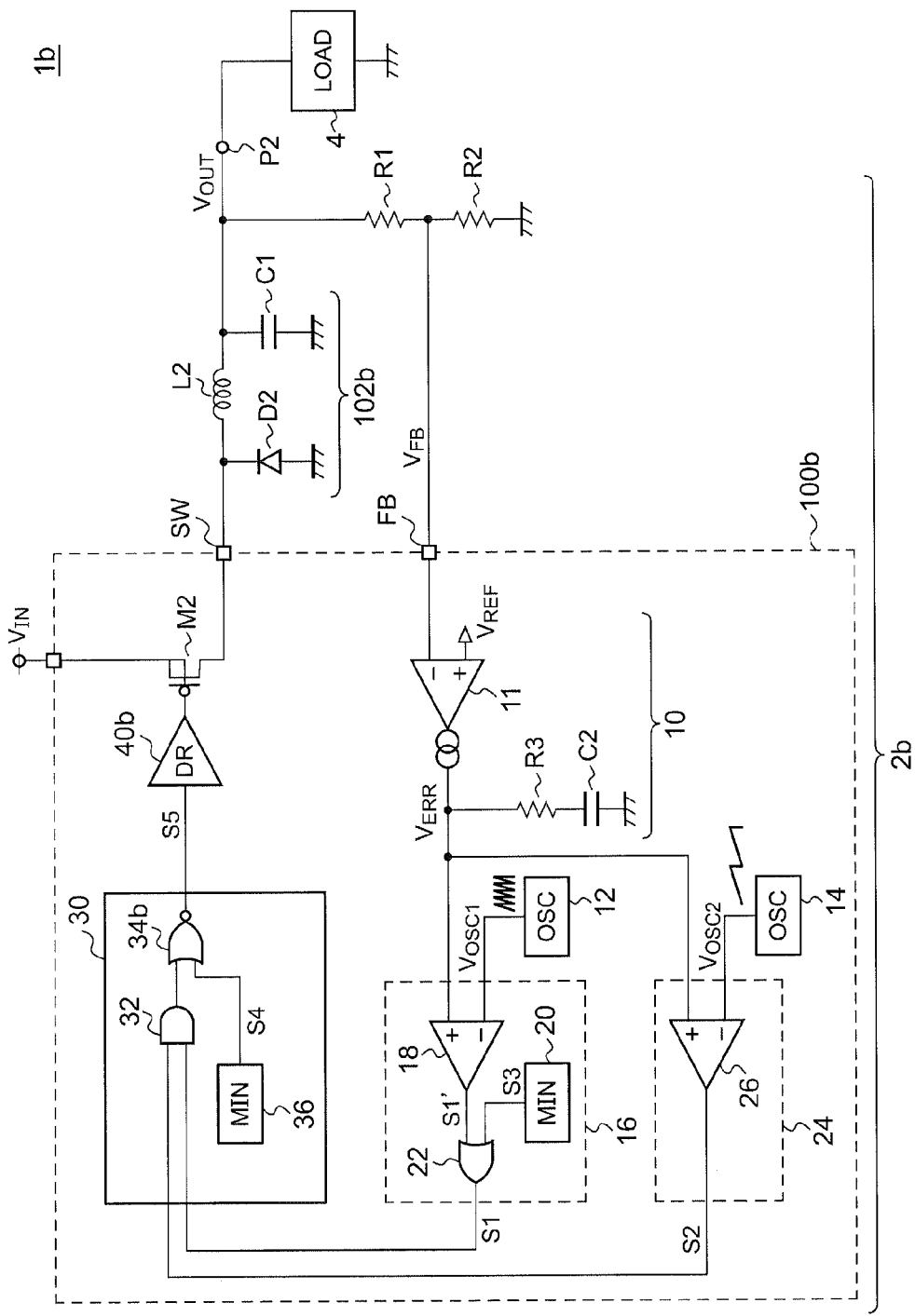
FIG. 6 is a circuit diagram which shows a configuration of a switching power supply according to a second modification.

FIG. 6 is a circuit diagram which shows a configuration of a switching power supply 2b according to a second modification. The switching power supply 2b is configured as a step-down switching regulator having a control circuit 100b configured employing the voltage mode in the same way as in FIG. 1. An output circuit 102b includes an inductor L2, a rectifier diode D2, and an output capacitor C1, and has a topology of a step-down switching regulator. It should be noted that a synchronous rectifier transistor may be employed instead of the rectifier element D2.

A switching transistor M2 is driven by a driver 40. The third logical gate 34 shown in FIG. 1 is replaced by a NOR gate 34b in FIG. 6.

It is needless to say that, with such an arrangement shown in FIG. 6, the third logical gate 34b and the second minimum pulse width signal generating unit 36 may be omitted. In a case in which the third logical gate 34b is omitted, an inverter (inverter 34c shown in FIG. 7) should be incorporated instead of such a third logical gate 34b.

[Third Modification]

Figure 7:
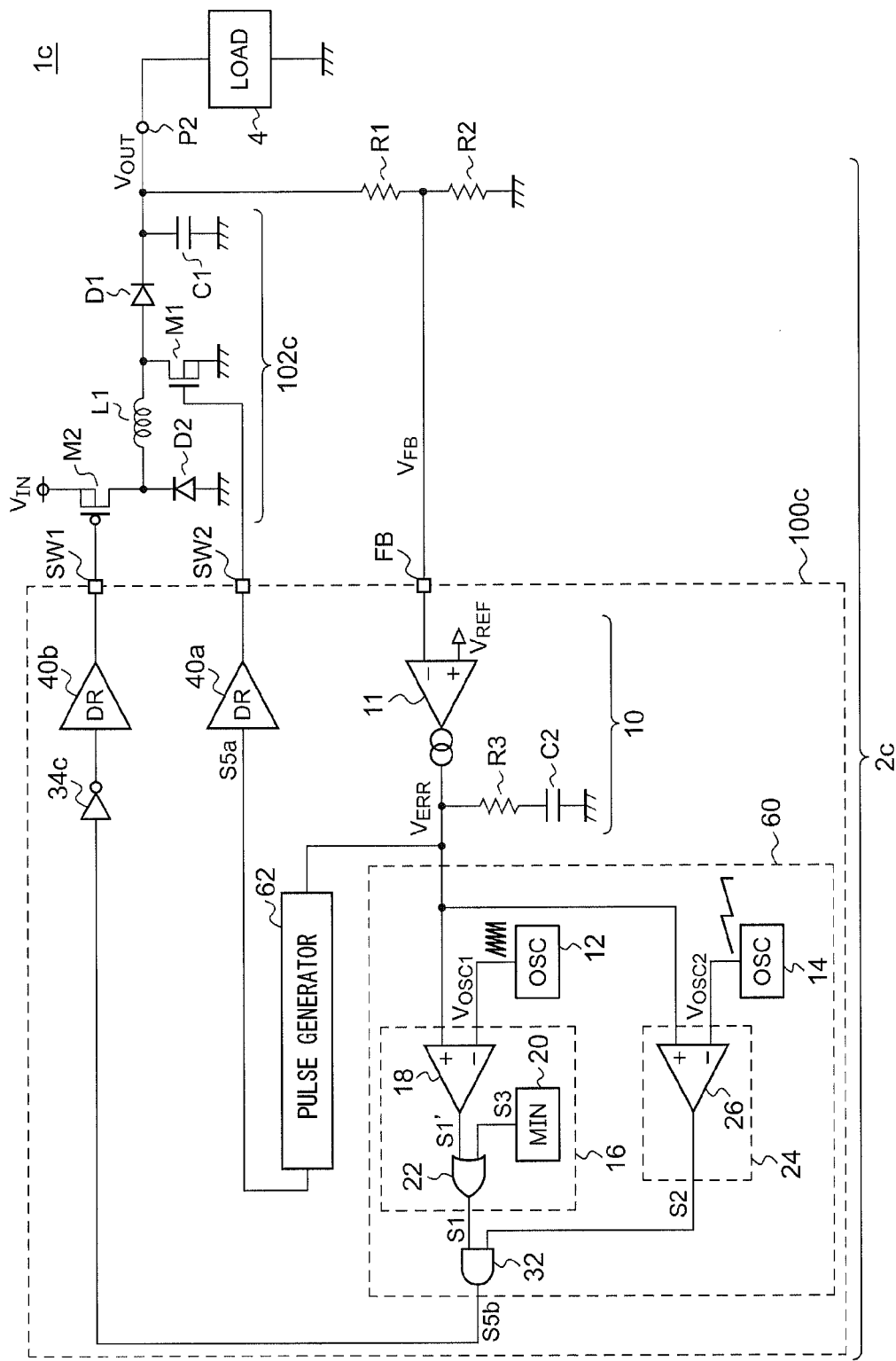
FIG. 7 is a circuit diagram which shows a configuration of a switching power supply according to a third modification.
Figure 8A:
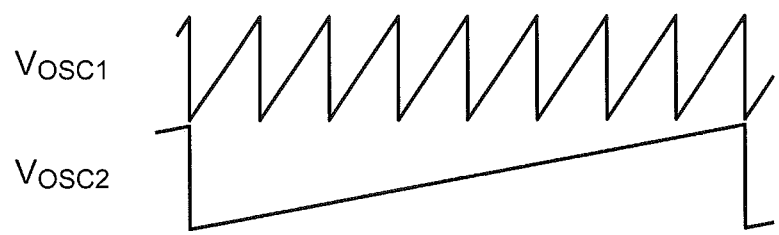
FIG. 8 is a waveform diagram which shows the operation of a switching power supply according to a fourth modification.
Figure 8B:
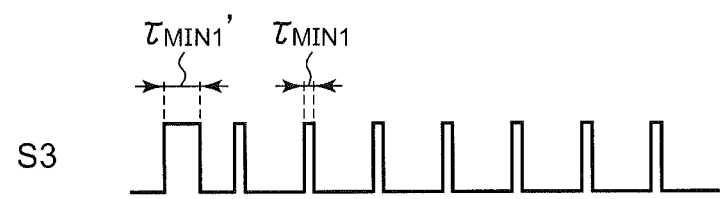
Figure 8C:
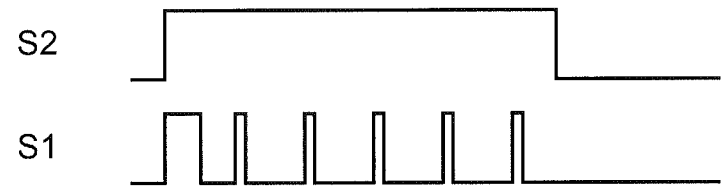
Figure 8D:
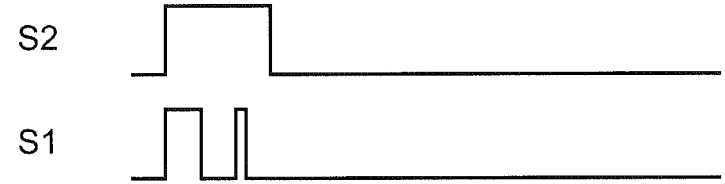

FIG. 7 is a circuit diagram which shows a configuration of a switching power supply 2c according to a third modification. The switching power supply 2c is configured as a step-up/step-down switching regulator having a control circuit 100c configured as voltage mode in the same way as in FIGS. 1 and 6.

An output circuit 102c has a step-down switching regulator topology. The switching transistors M1 and M2 may be included within the control circuit 100c in the form of internal components.

A driving pulse signal S5b for driving the switching transistor M2 is generated by the pulse generator 60. A driving pulse signal S5a for driving the switching transistor M1 is generated by a pulse generator 62. The pulse generators 60 and 62 each have the same configuration as those shown in FIGS. 1 and 6.

In order to limit the pulse width, such an arrangement shown in FIG. 7 may further include a second minimum pulse width signal generating unit 36 and a third logical gate 34 on the respective paths for the driving pulse signals S5a and S5b.

Also, a peak current mode configuration as shown in FIG. 5, an average current mode configuration, or a fixed on time (off time) mode configuration can be applied to such a step-down switching regulator shown in FIG. 6 and such a step-up/step-down switching regulator shown in FIG. 7, which can be understood by those skilled in this art.

[Fourth Modification]

When the frequency $f_1$ of the first cyclic signal $V_{OSC1}$ is K (K represents an integer of 2 or more) times the frequency $f_2$ of the second cyclic signal $V_{OSC2}$, the first minimum pulse width signal S3 has K pulses in each period of the second cyclic signal $V_{OSC2}$. Description has been made in the aforementioned embodiments and modifications regarding an arrangement in which the pulse widths of the K pulses are each set to the same pulse width, i.e., are each set to the first minimum pulse width $\tau_{MIN1}$.

In contrast, in a fourth modification, the first pulse modulator is configured to clamp the pulse width of each pulse included in the first pulse signal to a prescribed minimum value on a pulse-by-pulse basis. Such a fourth modification can be combined with any one of the aforementioned embodiments and modifications.

Specifically, the pulse widths of several pulses from among the K pulses included in the first minimum pulse width signal S3 are set to be longer than the first minimum pulse width $\tau_{MIN1}$. For example, an arrangement may be made in which, of the K pulses, the pulse widths of the first L pulses (where L is a constant that satisfies the relation $1 \leq L < K$) are set to be longer than the first minimum pulse width $\tau_{MIN1}$, and, specifically, to be double the first minimum pulse width $\tau_{MIN1}$, and the pulse widths of the other (K−L) pulses are each set to the first minimum pulse width $\tau_{MIN1}$.

The first minimum pulse width signal generating unit 20 configured to generate the first minimum pulse width signal S3 including pulses having different pulse widths can be configured by combining known techniques, which is readily conceived by those skilled in this art. The configuration of such a first minimum pulse width signal generating unit 20 is not restricted in particular. For example, the first minimum pulse width signal generating unit 20 can be configured employing a counter configured to detect the pulse width on a pulse-by-pulse basis.

FIG. 8 is a waveform diagram which shows the operation of the switching power supply according to the fourth modification. FIG. 8 shows an arrangement in which K=8 and L=1. That is to say, only the pulse width of the first pulse is set to a long pulse width, and the other pulse widths, i.e., the pulse widths of the second through eighth pulses, are each set to the first minimum pulse width $\tau_{MIN1}$.

The energy stored in the inductor L1 (L2) during each period of the second cyclic signal $V_{OSC2}$ is proportional to the sum total of the pulse widths of the first pulse signal S1 included in this period. Accordingly, an arrangement such as a fourth modification in which the first minimum pulse width signal S3 includes pulses having a greater pulse width than that of the other pulses requires switching of the switching transistor M1 (M2) a smaller number of times to supply the same amount of energy to the inductor L1 than what is required by an arrangement in which the first minimum pulse width signal S3 includes pulses having the same pulse width. In a light load state, such an arrangement that requires switching of the switching transistor M1 a smaller number of times has an advantage of reduced loss. Thus, such a fourth modification provides an advantage of reduced power consumption in the light load state.

In particular, an arrangement in which the pulse width of the first pulse is set to be greater has an advantage of a reduction in the number of times that switching is performed in the lightest load state. From this point of view, such an arrangement is preferably configured to be capable of clamping at least the pulse width of the first pulse to a predetermined value, i.e., a lower limit value, that is greater than the first minimum pulse width.

The pulse width of each pulse included in the first minimum pulse width signal S3 may be determined as follows.

For example, among the K pulses, the pulse widths of the (1+k×N)-th pulses may each be set to be greater than the first minimum pulse width, and the pulse widths of the other pulses may each be set to the first minimum pulse width. Also, the pulse widths of the pulses may be set such that they become sequentially shorter from the first pulse.

Such arrangements also provide an advantage of a reduction in the number of times that switching is performed in the light load state as compared with an arrangement in which all the pulses have the same pulse width, thereby providing improved efficiency.

The settings of the logical signals, such as the high-level state and the low-level state of the logical signals, and the magnitude relation between the respective voltage signals, have been described in the present embodiment for exemplary purposes only. The settings can be freely modified by inverting the signals using inverters or the like.

Second Embodiment

Figure 9:
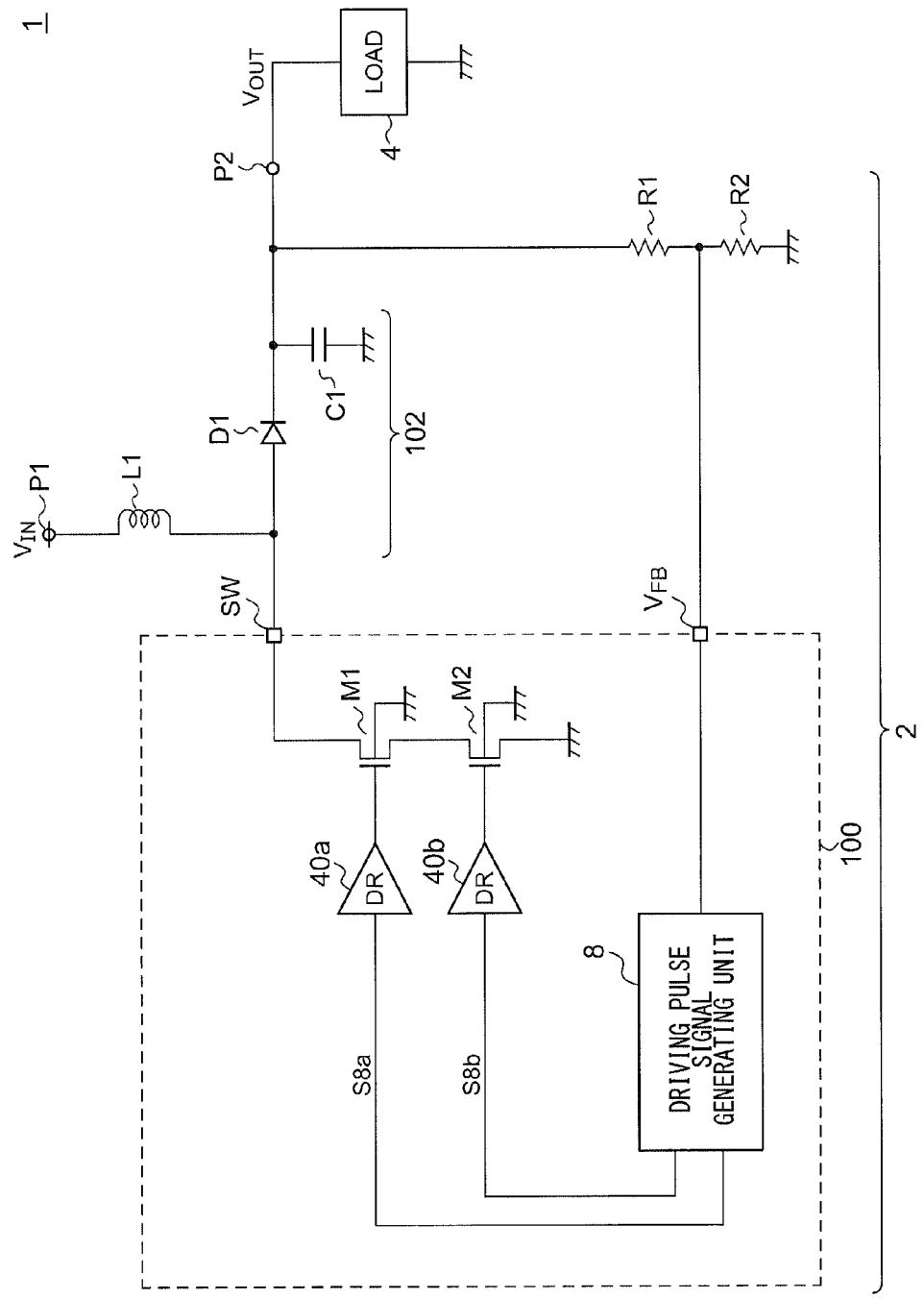
FIG. 9 is a circuit diagram which shows a configuration of an electronic device including a switching power supply according to a second embodiment.

FIG. 9 is a circuit diagram which shows a configuration of an electronic device 1 including a switching power supply 2 according to a second embodiment. The electronic device 1 is configured as a battery-driven device such as a cellular phone terminal, PDA (Personal Digital Assistant), portable audio player, digital still camera, or the like, and includes a switching power supply 2 and a load circuit 4. The switching power supply 2 is a step-up DC/DC converter configured to receive, via its input terminal P1, a DC input voltage $V_{IN}$ from an unshown battery or AC adapter, to boost the input voltage $V_{IN}$ thus received, and to output the boosted voltage as an output voltage $V_{OUT}$ to the load circuit 4 connected via its output terminal P2. The load circuit 4 is configured as a circuit which requires a voltage that is higher than the battery voltage. The configuration of the load circuit 4 is not restricted in particular.

The switching power supply 2 includes a first switching transistor M1, a second switching transistor M2, an output circuit 102, and a control circuit 100. In FIG. 9, the first switching transistor M1 and the second switching transistor M2 are each configured as a built-in component included in the control circuit 100. The control circuit 100 is configured as a function IC monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate.

The switching power supply 2 is a voltage-mode DC/DC converter configured to stabilize the output voltage $V_{OUT}$ by means of feedback. The output voltage $V_{OUT}$ is divided by the resistors R1 and R2. The output voltage thus divided is input to a feedback (FB) terminal of the control circuit 100 as a detection signal $V_{FB}$ that corresponds to the output voltage $V_{OUT}$.

The output circuit 102 includes an inductor L1, a rectifier element D1, and an output capacitor C1. The output circuit 102 has the same configuration as that of a smoothing rectifier circuit included in a typical step-up DC/DC converter, and accordingly, detailed description thereof will be omitted. Also, a synchronous rectifier transistor may be provided instead of the rectifier element D1.

The first switching transistor M1 and the second switching transistor M2 are sequentially arranged in series between a switching terminal SW to which one terminal of the inductor L1 is connected and the ground terminal. The control circuit 100 is configured to perform switching of the switching transistors M1 and M2 such that the detection signal $V_{FB}$ that corresponds to the output voltage $V_{OUT}$, which is one of the electrical states of the switching power supply 2, approaches a predetermined reference value. Thus, such an arrangement allows the output voltage $V_{OUT}$ to be stabilized regardless of the input voltage $V_{IN}$ and the state of the load circuit 4.

The control circuit 100 further includes a driving pulse signal generating unit 8, a first driver 40a, and a second driver 40b, in addition to the first switching transistor M1 and the second switching transistor M2.

The first switching transistor M1 is configured to have a breakdown voltage that is higher than that of the second switching transistor M2. For example, the first switching transistor M1 is configured as a transistor having a low threshold voltage Vth, and, specifically, is configured as a soft enhancement mode or depletion mode N-channel MOSFET. The second switching transistor M2 is configured as an ordinary N-channel MOSFET having a low breakdown voltage. From the point of view of the efficiency required of the switching power supply 2, the on resistances of the first switching transistor M1 and the second switching transistor M2 are each designed to be sufficiently low.

The electric potential at the switching terminal SW is switched between the ground voltage (0 V) and a voltage ($V_{OUT}$+Vf) which is obtained by adding the output voltage $V_{OUT}$ and the forward voltage Vf of the rectifier element D1. Accordingly, the first switching transistor M1 is designed so as to have a breakdown voltage that is equal to or greater than ($V_{OUT}$+Vf). On the other hand, rather than considering the breakdown voltage, the second switching transistor M2 is instead designed such that the leak current in the off state is sufficiently lower than that of the first switching transistor M1.

The driving pulse signal generating unit 8 is configured to generate a first driving pulse signal S8a having a duty ratio that is adjusted such that the output voltage $V_{OUT}$ approaches a target value. The first driver 40a performs on/off switching of the first switching transistor M1 according to the first driving pulse signal S8a. The second driver 40b turns on the second switching transistor M2 for at least a period during which the first switching transistor M1 is on. A second driving pulse signal S8b that is input to the second driver 40b is generated such that it is asserted for at least a period during which the first driving pulse signal S8a is asserted (e.g., set to high level).

The first driver 40a turns on the first switching transistor M1 after the second switching transistor M2 is turned on. Furthermore, the second driver 40b turns off the second switching transistor M2 after the first switching transistor M1 is turned off. That is to say, each positive edge of the second driving pulse signal S8b is positioned temporally before the corresponding positive edge of the first driving pulse signal S8a. Furthermore, each negative edge of the second driving pulse signal S8b is positioned temporally after the corresponding negative edge of the first driving pulse signal S8a.

The above is the configuration of the switching power supply 2 including the control circuit 100.

Figure 10A:
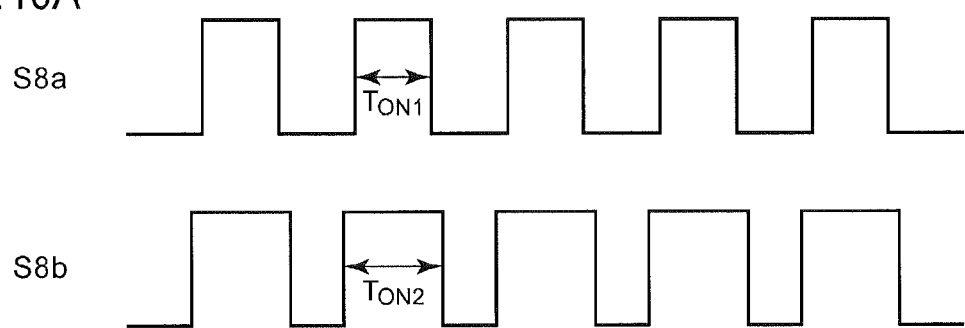
FIGS. 10A and 10B are time charts each showing an example of the operation of the switching power supply shown in FIG. 9.
Figure 10B:
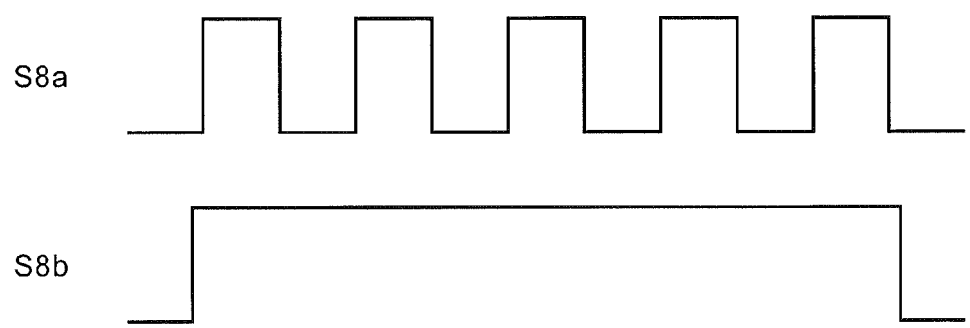

FIGS. 10A and 10B are time charts each showing an example of operation of the switching power supply 2 shown in FIG. 9.

In FIG. 10A, the second driving pulse signal S8b has the same frequency as that of the first driving pulse signal S8a. The pulse width $T_{ON1}$, which represents the on time of the driving pulse signal S8, is set to be slightly greater than the pulse width $T_{ON2}$, which represents the on time of the driving pulse signal S8a.

FIG. 10B shows another time chart. The second driving pulse signal S8b has a frequency that is lower than that of the first driving pulse signal S8a. The driving method shown in FIG. 10B is effectively employed in a case in which the switching transistor M1 is intermittently driven for a predetermined period of time, i.e., is stopped for a predetermined period of time.

The above is the operation of the switching power supply 2.

The first switching transistor M1 and the second switching transistor M2 are each configured to have a low on resistance. Thus, such an arrangement provides the same performance with respect to efficiency as that provided by a conventional arrangement including a single switching transistor.

In addition, such an arrangement provides an advantage of reduced leak current in a period in which both the first switching transistor M1 and the second switching transistor M2 are turned off. This is because such an arrangement includes the second switching transistor M2 having small leak current on a path of the leak current, as compared with conventional circuits including a single switching transistor.

Furthermore, the first switching transistor M1 is configured as a high breakdown voltage element. Thus, such an arrangement produces no problems even if the voltage $V_{OUT}$+ Vf is applied to the first switching transistor M1. Moreover, the first switching transistor M1 is turned on after the second switching transistor M2 is turned on, i.e., after the drain-source voltage Vds of the second switching transistor M2 becomes substantially zero. Thus, a high voltage that exceeds its breakdown voltage is not applied as a drain-source voltage of the second switching transistor M2. Similarly, the second switching transistor M2 is turned off after the first switching transistor M1 is turned off. Thus, in this stage, a high voltage that exceeds its breakdown voltage is not applied as the drain-source voltage of the second switching transistor M2.

As described above, such a switching power supply shown in FIG. 9 provides such advantages as a high breakdown voltage, low leak current, and high efficiency (low on resistance) in a balanced manner.

Comparing FIGS. 10A and 10B, with an arrangement shown in FIG. 10A, the second switching transistor M2 shown in FIG. 10A has a short on time as compared with an arrangement shown in FIG. 10B. Thus, an arrangement shown in FIG. 10A provides an advantage of reduced leak current as compared with an arrangement shown in FIG. 10B. In contrast, an arrangement shown in FIG. 10B has an advantage of a reduction in the number of times that switching of the second transistor M2 is performed, as compared with an arrangement shown in FIG. 10A. Thus, such an arrangement provides an advantage of reduced electric power required to charge and discharge the gate capacitor of the second switching transistor M2. Which method is selected from the arrangements shown in FIGS. 10A and 10B should be determined based upon a comparison between the leak current and the current required to charge and discharge the gate capacitor of the second switching transistor M2 in the switching operation.

Third Embodiment

Detailed description will be made in the third embodiment regarding a circuit in which the frequencies of the first driving pulse signal S8a and the second driving pulse signal S8b are different.

Figure 11:
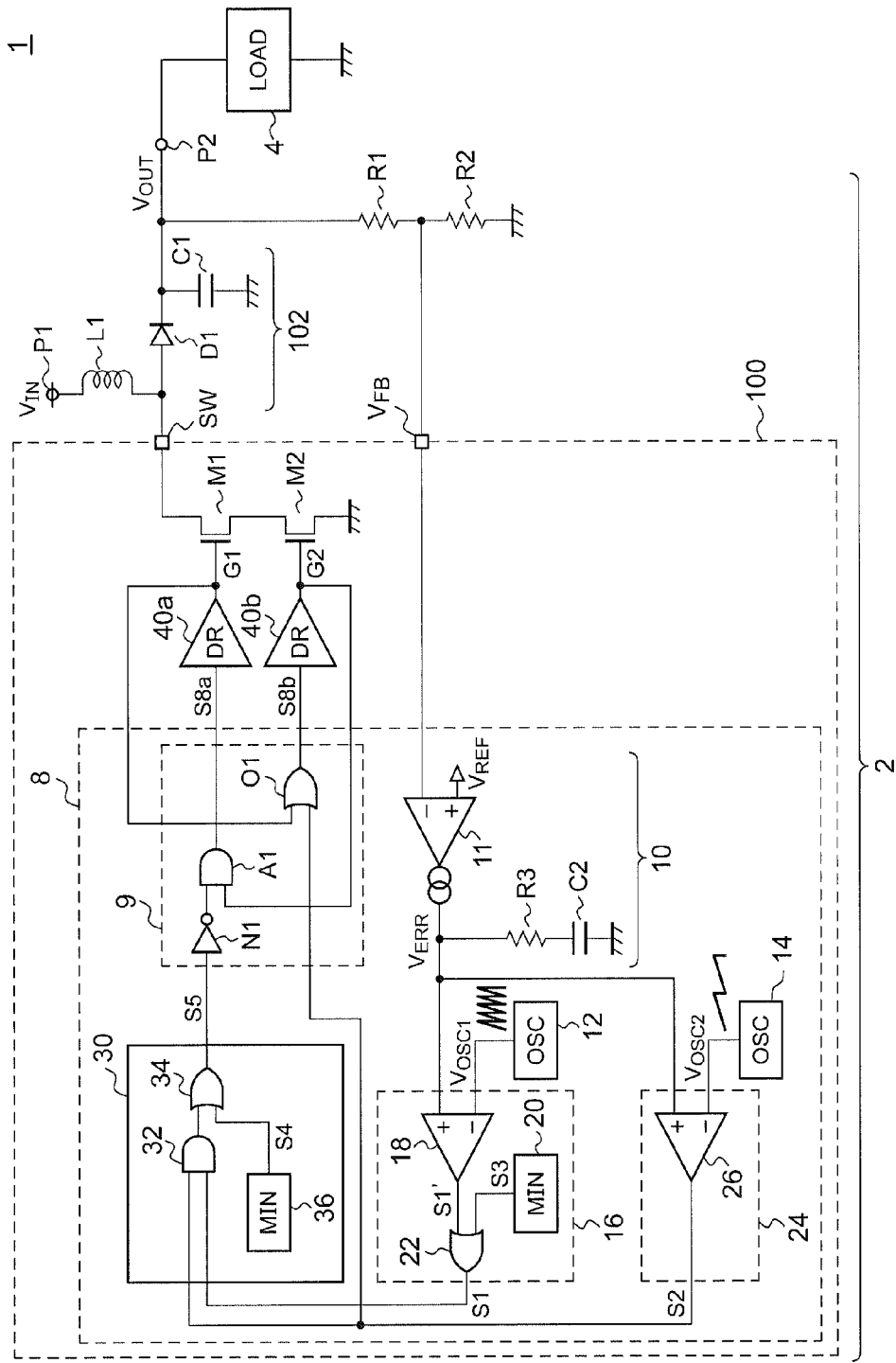
FIG. 11 is a circuit diagram which shows a configuration of an electronic device including a switching power supply according to a third embodiment.

FIG. 11 is a circuit diagram which shows a configuration of a switching power supply 2 according to the third embodiment.

The driving pulse signal generating unit 8 includes an error amplifier 10, a first oscillator 12, a second oscillator 14, a first pulse modulator 16, a second pulse modulator 24, and a synthesizing unit 30.

The error amplifier 10 is configured to generate an error signal $V_{ERR}$ that corresponds to the difference between a predetermined reference voltage $V_{REF}$ and an output voltage $V_{OUT}$ which represents the electrical state of the switching power supply 2. The error amplifier 10 includes a gm amplifier 11, a capacitor C2, and a resistor R3, for example. The gm amplifier 11 is configured to generate an output current that corresponds to the difference between the reference voltage $V_{REF}$ and a feedback signal $V_{FB}$. By charging and discharging the capacitor C2 using the output current of the gm amplifier 11, such an arrangement generates the error signal $V_{ERR}$. The resistor R3 and the capacitor C2 also provide a phase compensation function. When $V_{FB}$ is higher than $V_{REF}$, the voltage level of the error signal $V_{ERR}$ rises, and when $V_{FB}$ is lower than $V_{REF}$, the voltage level of the error signal $V_{ERR}$ falls.

The first oscillator 12 generates a first cyclic signal $V_{OSC1}$ having a cyclic slope segment. The frequency of the first cyclic signal $V_{OSC1}$ is set to a first frequency $f_1$. For example, the first frequency $f_1$ is set to a value which allows the switching power supply 2 to perform feedback control in a sure manner. The first cyclic signal $V_{OSC1}$ may have a triangular waveform or a sawtooth waveform.

The second oscillator 14 generates a second cyclic signal $V_{OSC2}$ having a cyclic slope segment. The frequency of the second cyclic signal $V_{OSC2}$ is set to a second frequency $f_2$ that is lower than the first frequency $f_1$. The second frequency $f_2$ is preferably set to a frequency that is higher than the 20 Hz to 20 kHz audible band. The second cyclic signal $V_{OSC2}$ may also have a triangular waveform or a sawtooth waveform.

The relation between the first frequency $f_1$ and the second frequency $f_2$ is preferably determined such that the first frequency $f_1$ is equal to an integer multiple of the second frequency $f_2$. More preferably, it is determined to be equal to a value obtained by multiplying the first frequency $f_1$ by $2^m$ (m represents an integer). This allows such an arrangement to generate either the first frequency $f_1$ or the second frequency $f_2$ in a simple manner by dividing or multiplying the other frequency. Description will be made in the present embodiment regarding an arrangement in which the first frequency $f_1$ is set to 400 kHz, and the second frequency $f_2$ is set to 400/16=25 kHz.

The first pulse modulator 16 is configured to generate a first pulse signal S1 by comparing a signal that corresponds to the error signal $V_{ERR}$ with the first cyclic signal $V_{OSC1}$. In FIG. 11, the error signal $V_{ERR}$ itself is used as such a signal that corresponds to the error signal $V_{ERR}$. Also, a signal obtained by level shifting, voltage dividing, or other signal processing of the error signal $V_{ERR}$ may be compared with the first cyclic signal $V_{OSC1}$.

The first pulse signal S1 has a pulse width (duty ratio) $\tau_1$ that changes according to the error signal $V_{ERR}$. That is to say, the first pulse signal S1 is subjected to pulse width modulation. Furthermore, the first pulse modulator 16 is configured to be capable of clamping the pulse width $\tau_1$ of the first pulse signal S1 to a first minimum pulse width $\tau_{MIN1}$.

Specifically, the first pulse modulator 16 includes a first comparator 18, a first minimum pulse width signal generating unit 20, and a first logical gate 22. The first comparator 18 is configured to compare the error signal $V_{ERR}$ with the first cyclic signal $V_{OSC1}$, and to generate a first intermediate pulse signal S1' which is set to high level when $V_{ERR}$ is greater than $V_{OSC1}$. As the error signal $V_{ERR}$ becomes smaller, the pulse width (duty ratio) of the first intermediate pulse signal S1' becomes shorter.

The first minimum pulse width signal generating unit 20 is configured to generate a first minimum pulse width signal S3 having the first frequency $f_1$ and the first minimum pulse width $\tau_{MIN1}$. The first logical gate 22 performs a logical operation on the first intermediate pulse signal S1' and the first minimum pulse width signal S3, and, specifically, generates the logical OR of these signals, so as to generate the first pulse signal S1. The pulse width $\tau_1$ of the first pulse signal S1 is clamped to the first minimum pulse width $\tau_{MIN1}$. Thus, such an arrangement prevents the first pulse signal S1 from having a pulse width that is lower than the first minimum pulse width $\tau_{MIN1}$.

The second pulse modulator 24 is configured to compare a signal that corresponds to the error signal $V_{ERR}$ with the second cyclic signal $V_{OSC2}$ so as to generate a second pulse signal S2 having a pulse width $\tau_2$ that corresponds to the error signal $V_{ERR}$. The second pulse modulator 24 includes a second comparator 26. The second comparator 26 is configured to compare the error signal $V_{ERR}$ with the second cyclic signal $V_{OSC2}$, and to generate a second pulse signal S2 which is set to high level when $V_{ERR}$ is greater than $V_{OSC2}$. As the error signal $V_{ERR}$ becomes smaller, the pulse width (duty ratio) $\tau_2$ of the second pulse signal S2 becomes shorter. That is to say, the second pulse signal S2 is also subjected to pulse width modulation.

The first pulse modulator 16 is configured to reduce the pulse width $\tau_1$ of the first pulse signal S1 according to a reduction in the error signal $V_{ERR}$. When the error signal $V_{ERR}$ becomes smaller than a predetermined threshold level Vth, the first pulse modulator 16 clamps the pulse width $\tau_1$ to the first minimum pulse width $\tau_{MIN1}$. On the other hand, in such a state in which the pulse width of the first pulse signal S1 is clamped, the second pulse modulator 24 reduces the pulse width of the second pulse signal S2 according to a reduction in the error signal $V_{ERR}$.

In order to provide such an operation, the oscillator 12 is configured to generate the first cyclic signal $V_{OSC1}$ that is changed within a range between a first lower limit level $V_{L1}$ and a first upper limit level $V_{H1}$ that is higher than the first lower limit level. On the other hand, the second oscillator 14 is configured to generate the second cyclic signal $V_{OSC2}$ that is changed within a range between a second lower limit level $V_{L2}$ that is lower than the first lower limit level $V_{L1}$ and a second upper limit level $V_{H2}$ that is higher than the second lower limit level $V_{L2}$. The second lower limit level $V_{L2}$ is preferably set to a value that is higher than the lower limit (e.g., 0.2 V) of the output voltage range of the gm amplifier 11.

The first pulse modulator 16 is configured to compare the error signal $V_{ERR}$ with the first cyclic signal $V_{OSC1}$ so as to generate the first pulse signal S1. Furthermore, the second pulse modulator 24 is configured to compare the error signal $V_{ERR}$ with the second cyclic signal $V_{OSC2}$ so as to generate the second pulse signal S2.

The synthesizing unit 30 is configured to combine the first pulse signal S1 and the second pulse signal S2 so as to generate a driving pulse signal S5. Specifically, the synthesizing unit 30 masks the first pulse signal S1 using the second pulse signal S2, so as to generate the driving pulse signal S5. Furthermore, the synthesizing unit 30 is configured to clamp the pulse width of the driving pulse signal S5 such that it does not fall below a predetermined second minimum pulse width $\tau_{MIN2}$.

The synthesizing unit 30 includes a second logical gate 32, a third logical gate 34, and a second minimum pulse width signal generating unit 36. The second logical gate 32 is configured as an AND gate, and is configured to generate a signal S5' that corresponds to the logical AND of the first pulse signal S1 and the second pulse signal S2. The second minimum pulse width signal generating unit 36 is configured to generate a second minimum pulse width signal S4 having the second frequency $f_2$ and the second minimum pulse width $\tau_{MIN2}$. The third logical gate 34 generates the logical OR of the two signals S5' and S4, thereby clamping the pulse width of the driving pulse signal S5 such that it is equal to or greater than the second minimum pulse width $\tau_{MIN2}$.

The output stage 9 of the driving pulse signal generating unit 8 is configured to generate a first driving pulse signal S8a that corresponds to the driving pulse signal S5, and a second driving pulse signal S8b that corresponds to the second pulse signal S2.

The output stage 9 has a "cross-coupled" configuration. The output stage 9 includes an inverter N1, an AND gate A1, and an OR gate O1. The AND gate A1 is configured to generate the logical AND of the driving pulse signal S5 inverted by the inverter N1 and the gate signal G2 of the second switching transistor M2, and to output the signal thus generated as the first driving pulse signal S8a. The OR gate O1 is configured to generate the logical OR of the second pulse signal S2 and the gate signal G1 of the first switching transistor M1, and to output the signal thus generated as the second driving pulse signal S8b. Such a cross-coupled configuration ensures that the positive edge of the second driving pulse signal S8b is positioned temporally before the positive edge of the first pulse signal S8a. Furthermore, this ensures that the negative edge of the second driving pulse signal S8b is positioned temporally after the negative edge of the first driving pulse signal S8a. It should be noted that the configuration of the output stage 9 is not restricted to such an arrangement shown in FIG. 11. Also, various kinds of modifications may be made.

The first driver 40a is configured to drive the first switching transistor M1 according to the first driving pulse signal S8a. On the other hand, the second driver 40b is supplied with the second pulse signal S2 as the second driving pulse signal S8b. The second driver 40b is configured to drive the second switching transistor M2 according to the second driving pulse signal S8b. As a result, the on/off duty ratios of the switching transistors M1 and M2 are each adjusted such that the feedback signal $V_{FB}$ matches the reference voltage $V_{REF}$, thereby stabilizing the output voltage $V_{OUT}$.

The above is the configuration of the switching power supply 2 including the control circuit 100 according to the third embodiment. Next, description will be made regarding the operation thereof.

Figure 12A:
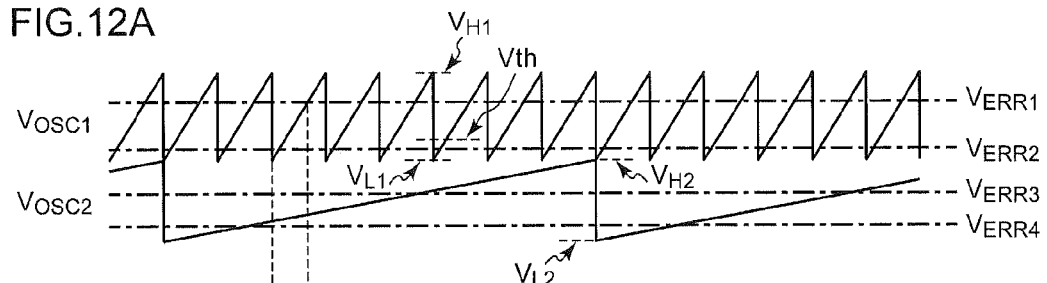
FIGS. 12A through 12E are time charts each showing the operation of the switching power supply shown in FIG. 11.

FIGS. 12A through 12E are time charts each showing the operation of the switching power supply 2 shown in FIG. 11. FIG. 12A shows the first cyclic signal $V_{OSC1}$, the second cyclic signal $V_{OSC2}$, and error signals $V_{ERR1}$ through $V_{ERR4}$ that each have various different levels. FIGS. 12B through 12E each show pulse waveforms for the respective error signals $V_{ERR1}$ through $V_{ERR4}$.

Figure 12B:
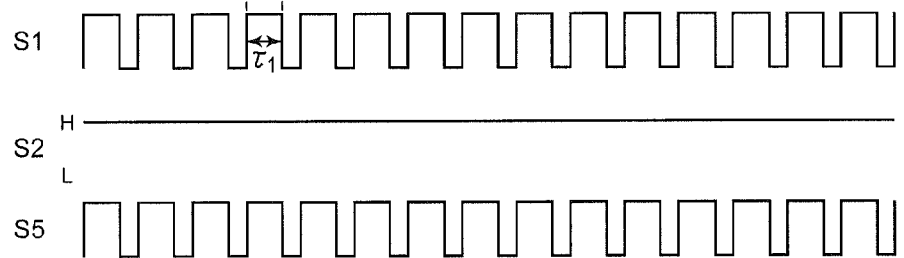

As shown in FIG. 12B, when the error signal $V_{ERR}$ is relatively large ($V_{ERR1}$), the first pulse signal S1 has a pulse width $\tau_1$ that corresponds to the error signal $V_{ERR}$. In this state in which $V_{ERR1} > V_{OSC2}$, the second pulse signal S2 is maintained at high level. As a result, the first driving pulse signal S8a is configured as the same pulse signal as the first pulse signal S1.

Figure 12C:
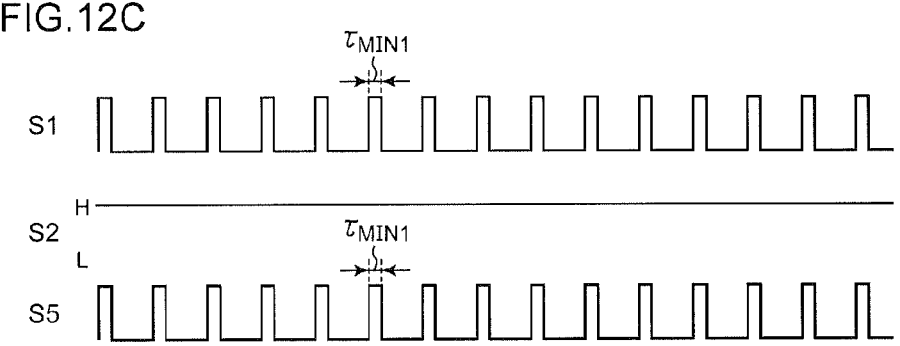

As the error signal $V_{ERR}$ becomes smaller, the pulse width $\tau_1$ of the first pulse signal S1 becomes shorter. When the error signal $V_{ERR}$ is lower than a predetermined level, the pulse width $\tau_1$ of the first pulse signal S1 is clamped to the first minimum pulse width $\tau_{MIN1}$. As shown in FIG. 12C, the second pulse signal S2 is maintained at high level for the error signal $V_{ERR2}$. In this case, the first driving pulse signal S8a is configured as a pulse signal having the first minimum pulse width $\tau_{MIN1}$ and the frequency $f_1$.

Figure 12D:
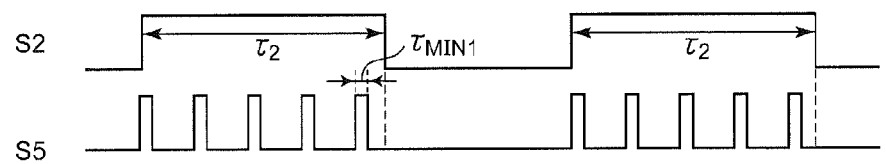

Referring to FIG. 12D, when the error signal $V_{ERR}$ becomes still smaller ($V_{ERR3}$), the pulse width $\tau_1$ of the first pulse signal S1 is clamped to the first minimum pulse width $\tau_{MIN1}$. Furthermore, the pulse width of the second pulse signal S2 is determined according to the error signal $V_{ERR}$. That is to say, the number of pulses included in the first driving pulse signal S8a changes according to the error signal $V_{ERR}$.

Figure 12E:
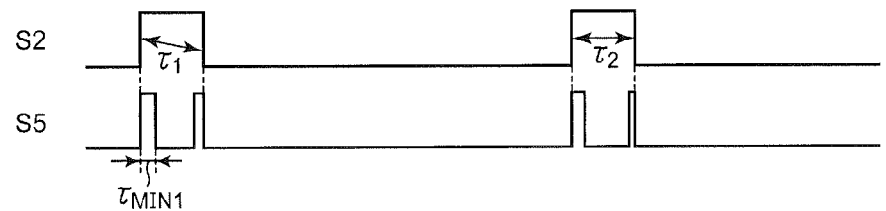

Referring to FIG. 12E, if the error signal $V_{ERR}$ becomes still smaller ($V_{ERR4}$), the pulse width $\tau_2$ of the second pulse signal S2 is reduced. In this case, the pulse width $\tau_2$ of the last pulse in each cycle of the first driving pulse signal S8a is reduced according to a reduction in the pulse width $\tau_2$ of the second pulse signal S2, and the last pulse ultimately disappears, thereby reducing the number of pulses included in each cycle of the first driving pulse signal S8a.

The above is the operation of the switching power supply 2.

With such a switching power supply 2, by providing the first switching transistor M1 and the second switching transistor M2, such an arrangement provides the three advantages of reduced leak current, reduced on resistance, and high breakdown voltage in a balanced manner.

Furthermore, with such a switching power supply 2, when the load is heavy, the operation is performed in the range $V_{L1} < V_{ERR} < V_{H1}$. In this case, the duty ratio of the first pulse signal S1 is adjusted, and the switching transistor M1 is driven with the first frequency $f_1$.

As the load becomes lighter, the error signal $V_{ERR}$ becomes smaller, which reduces the duty ratio of the first pulse signal S1. When $V_{ERR}$ becomes smaller than Vth, switching of the switching transistor M1 is performed with the first minimum pulse width $\tau_1$.

As the load becomes even lighter, the driving operation is performed in the range $V_{L2} < V_{ERR} < V_{H2}$. The pulse width $\tau_2$ of the second pulse signal S2 is reduced according to a reduction in the load. In this case, a part of the first pulse signal S1 is masked, which reduces the effective on time of the switching transistor M1.

When the pulse width of the second pulse signal S2 is further reduced, ultimately only one pulse that corresponds to the first pulse of the first pulse signal S1 remains in the first driving pulse signal S8a, and the driving frequency of the switching transistor M1 becomes the same as the second frequency $f_2$. In this stage, the pulse width of the driving pulse signal S8a that corresponds to the first pulse is reduced to the second minimum pulse width $\tau_{MIN2}$. Thus, in a light load state, such an arrangement is capable of performing intermittent switching of the switching transistor M1 with an extremely short pulse.

That is to say, with such a switching power supply 2, even in a light load state, the switching frequency of the switching transistor M1 is clamped such that it does not become lower than the second frequency $f_2$. Thus, such an arrangement is capable of suppressing change in frequency, as compared with conventional switching power supplies configured to perform a driving operation in an intermittent mode (which is also referred to as a "pulse frequency modulation mode").

By setting the second frequency $f_2$ to a value that is higher than the audible band, such an arrangement is capable of suppressing the occurrence of acoustic noise.

The above are the basic configurations, operations, and advantages of the switching power supply 2. Next, description will be made regarding modifications thereof and specific example configurations thereof.

With such a switching power supply 2 shown in FIG. 11, a dead band could occur in which the effective on time of the first driving pulse signal S8a does not change even if the error signal $V_{ERR}$ changes, which is undesirable from the point of view of system stability. Examples of problems that occur due to such a dead band include a problem of fluctuation in the number of pulses of the first pulse signal S1 contained in each period of the second pulse signal S2, due to fluctuation in the pulse width of the second pulse signal S2 in the light load state.

For example, FIG. 12A shows an arrangement in which the first lower limit level $V_{L1}$ is approximately equal to the second upper limit level $V_{H2}$. In this case, a dead band occurs in the range $V_{H2} < V_{ERR} < $ Vth in which the first driving pulse signal S8a does not change even if the error signal $V_{ERR}$ changes. In order to prevent such a dead band from occurring, $V_{H2}$ may be preferably set to be greater than $V_{L1}$, and $V_{H2}$ may be preferably set to be approximately equal to Vth. With such an arrangement, when the error signal $V_{ERR}$ becomes smaller, and the pulse width of the first pulse signal S1 is clamped, the pulse width of the second pulse signal S2 is immediately reduced, thereby eliminating such a dead band.

Furthermore, it should be noted that a dead band occurs in the range $V_{L2} < V_{ERR} < V_{H2}$. That is to say, when a trailing edge (negative edge) of the second pulse signal S2 changes in a period in which the first pulse signal S1 is low level, a change in the error signal $V_{ERR}$ does not provide a change in the first driving pulse signal S8a. This problem can be solved by modifying the waveform of the second cyclic signal $V_{OSC2}$.

Figure 13:
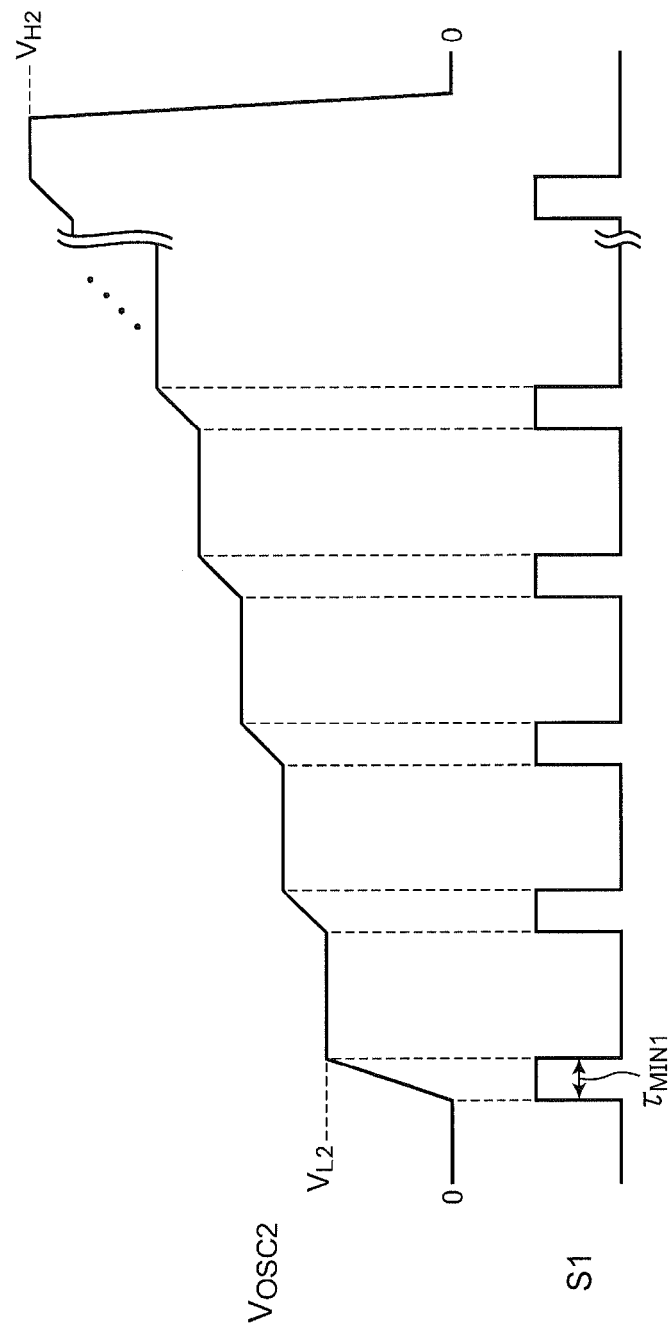
FIG. 13 is a waveform diagram which shows a second cyclic signal generated in order to eliminate a dead band.

FIG. 13 is a waveform diagram showing the second cyclic signal $V_{OSC2}$ designed so as to solve the problem of such a dead band. The second oscillator 14 generates the second cyclic signal $V_{OSC2}$ that has a slope in a period of the first minimum pulse width $\tau_{MIN1}$ in which the first pulse signal S1 is high level, and that is flat in the other periods. Such an arrangement is capable of eliminating such a dead band.

Figure 14:
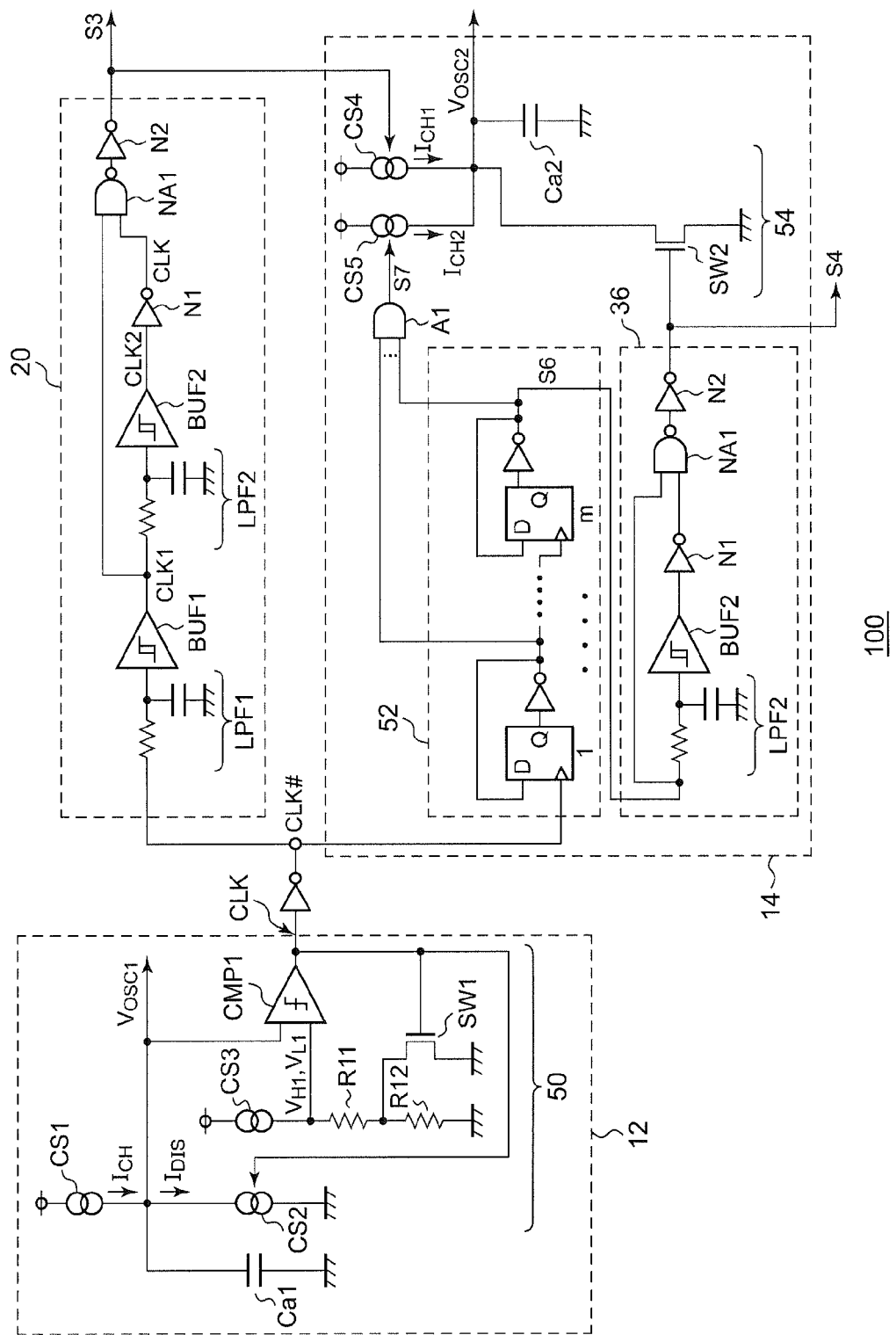
FIG. 14 is a circuit diagram which shows a specific example configuration of a part of the control circuit.

FIG. 14 is a circuit diagram which shows a specific example configuration of a part of the control circuit 100. FIG. 14 shows the first oscillator 12, the second oscillator 14, the first minimum pulse width signal generating unit 20, and the second minimum pulse width signal generating unit 36, from among the components of the control circuit 100.

The first oscillator 12 includes a first capacitor Ca1 and a first charging/discharging circuit 50. One terminal of the first capacitor Ca1 is grounded. When the voltage $V_1$ at the first capacitor Ca1 reaches a first upper limit level $V_{H1}$, the first charging/discharging circuit 50 starts discharging, and when the voltage $V_1$ at the first capacitor Ca1 reaches a first lower limit level $V_{L1}$, the first charging/discharging circuit 50 starts charging. The first oscillator 12 outputs the voltage $V_1$ at the first capacitor Ca1 as the first cyclic signal $V_{OSC1}$.

The first charging/discharging circuit 50 includes current sources CS1, CS2, and CS3, a comparator CMP1, resistors R11 and R12, and a switch SW1. The current source CS1 supplies a charging current $I_{CH}$ to the first capacitor Ca1. The current source CS2 is configured to be switchable between an on state and an off state. In the on state, the current source CS2 discharges the first capacitor Ca1 with a discharging current $I_{DIS}$.

The current source CS3, the resistors R11 and R12, and the switch SW1 form a voltage source configured to generate the voltages $V_{L1}$ and $V_{H1}$. The current source CS3 is configured to generate a reference current $I_{REF}$. In the on state of the switch SW1, the first lower limit level $V_{L1}=V_{REF}\times R11$ is generated. In the off state of the switch SW1, the first upper limit level $V_{H1}=I_{REF}\times(R11+R12)$ is generated. The comparator CMP1 is configured to compare the voltage at the first capacitor Ca1 with the reference voltage $V_{L1}/V_{H1}$, and to switch the on/off state of the switch SW1 and the on/off state of the current source CS2 according to the comparison result.

Such a first oscillator 12 generates the first cyclic signal $V_{OSC1}$ having a sawtooth waveform with a peak level $V_{H1}$ and a bottom level $V_{L1}$.

The output signal (synchronization clock) CLK of the comparator CMP1 has a level that transits according to switching of the charging/discharging circuit (CS1 and CS2) between the charging state and the discharging state. The synchronization clock CLK is inverted by an inverter N3, and the synchronization clock CLK thus inverted is output to the first minimum pulse width signal generating unit 20 and the first charging/discharging circuit 50.

The first minimum pulse width signal generating unit 20 includes low-pass filters LPF1 and LPF2, a buffer BUF1, inverters N1 and N2, and a NAND gate NA1. The low-pass filter LPF1 performs filtering of the input synchronization clock CLK# ("#" represents logical inversion). The buffer BUF1 is a hysteresis buffer (Schmitt buffer) configured to receive the output of the low-pass filter LPF1. The low-pass filter LPF1 and the buffer BUF1 delay the synchronization clock CLK1 by the first minimum pulse width $\tau_{MIN1}$ so as to generate the synchronization clock CLK1.

Furthermore, the low-pass filter LPF2 and the buffer BUF2 delay the synchronization clock CLK so as to generate the synchronization clock CLK2. By generating the logical AND of the synchronization clock CLK1 and the inverted synchronization clock CLK2# obtained by inverting the synchronization clock CLK2, such an arrangement generates the first minimum pulse width signal S3 having the first minimum pulse width $\tau_{MIN1}$.

The second oscillator 14 includes a second capacitor Ca2, a frequency divider 52, and a second charging/discharging circuit 54. The frequency divider 52 divides the frequency of the synchronization clock CLK#. The frequency divider 52 includes m stages of ½ frequency dividers. In a case in which the frequency divider 52 includes four stages of such ½ frequency dividers, the frequency of the synchronization clock CLK# is divided by 16. That is to say, the frequency divider 52 outputs a pulse signal S6 having the second frequency $f_2$.

The second charging/discharging circuit 54 includes current sources CS4 and CS5, and a discharging switch SW2.

In the frequency divider 52, the m signals thus frequency divided at the respective stages pass through an AND gate A1. The AND gate A1 generates a pulse signal S7 which is asserted (set to high level) once every 16 pulses of the synchronization clock CLK#. The pulse signal S7 has the second frequency $f_2$ and the same pulse width as that of the synchronization clock CLK. When the pulse signal S7 is asserted, the current source CS5 is turned on, thereby charging the second capacitor Ca2. As a result of charging the second capacitor Ca2 using the current source CS5, the second cyclic signal $V_{OSC2}$ rapidly rises from 0 V up to the second lower limit level $V_{L2}$. The first lower limit level $V_{L2}$ is determined according to the charging current $I_{CH2}$ supplied from the current source CS5.

$$V_{L2}=\tau_{MIN1}\times I_{CH2}/Ca2$$

Subsequently, the current source CS4 is turned on every time the first minimum pulse width signal S3 is asserted (set to high level), which supplies the charging current $I_{CH1}$ to the second capacitor Ca2, thereby charging the second capacitor Ca2. The current value of the charging current $I_{CH1}$ determines the slope of the second and subsequent pulses of the second cyclic signal $V_{OSC2}$ shown in FIG. 13.

The second minimum pulse width signal generating unit 36 is configured similarly to the first minimum pulse width signal generating unit 20. The second minimum pulse width signal generating unit 36 receives the pulse signal S6 having the second frequency $f_2$, and generates the second minimum pulse width signal S4 having the second minimum pulse width $\tau_2$. The discharging switch SW2 is turned on every time the second minimum pulse width signal S4 is asserted, which discharges the second capacitor Ca2.

Such a second oscillator 14 shown in FIG. 14 is capable of generating the second cyclic signal $V_{OSC2}$ having such a slope with respect to each on period of the first minimum pulse width signal S3 as shown in FIG. 13.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

Description has been made in the embodiment regarding a step-up switching power supply. Also, the present invention can be applied to a step-down switching power supply, or to a step-up/step-down switching power supply. Also, the present invention can be applied to an insulating switching power supply including a transformer instead of the inductor L1.

Description has been made in the embodiment regarding a voltage mode switching power supply. Also, the present invention can be applied to various kinds of switching power supplies employing different modes such as a peak current mode, an average current mode, etc. In this case, the configurations of the first pulse modulator 16 and the second pulse modulator 24 should be modified corresponding to the feedback method, which is readily conceived by those skilled in this art.

The settings of the logical signals, such as the high-level state and the low-level state of the logical signals, and the magnitude relation between the respective voltage signals, have been described in the present embodiment for exemplary purposes only. The settings can be freely modified by inverting the signals using inverters or the like.

Modifications described above in the first embodiment may be applied to the third embodiment, which is encompassed within the scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a step-up, a step-down, or otherwise a step-up/step-down switching power supply comprising a switching element, the control circuit comprising:
    an error amplifier configured to generate an error signal that corresponds to the difference between a feedback signal which represents an electrical state of the switching power supply and a predetermined reference voltage;
    a first oscillator configured to generate a first cyclic signal having a first frequency;
    a second oscillator configured to generate a second cyclic signal having a sloping segment and having a second frequency that is lower than the first frequency;
    a first pulse modulator configured to generate, based upon a signal that corresponds to the error signal and the first frequency signal, a first pulse signal having the first frequency and having a pulse width that corresponds to the error signal, and to clamp the pulse width of the first pulse signal such that it does not become smaller than a predetermined first minimum pulse width which is a lower limit value;
    a second pulse modulator configured to compare the signal that corresponds to the error signal with the second cyclic signal so as to generate a second pulse signal having a pulse width that corresponds to the error signal;
    a synthesizing unit configured to combine the first pulse signal and the second pulse signal so as to generate a driving pulse signal; and
    a driver configured to drive the switching element according to the driving pulse signal.

2. A control circuit according to claim 1, wherein the first pulse modulator is configured to reduce the pulse width of the first pulse signal according to the error signal becoming smaller, and to clamp the pulse width of the first pulse signal to the first minimum pulse width, which is a lower limit value, when the error signal becomes smaller than a predetermined threshold level,
    and wherein the second pulse modulator is configured to reduce the pulse width of the second pulse signal according to the error signal becoming smaller in a state in which the pulse width of the first pulse signal is clamped.

3. A control circuit according to claim 2, wherein the first cyclic signal has a sloping segment that changes between a first lower limit level and a first upper limit level that is higher than the first lower limit level,
    and wherein the second cyclic signal changes between a second lower limit level that is lower than the first lower limit level and a second upper limit level that is higher than the second lower limit level,
    and wherein the first pulse modulator is configured to compare the error signal with the first cyclic signal so as to generate the first pulse signal,
    and wherein the second pulse modulator is configured to compare the error signal with the second cyclic signal so as to generate the second pulse signal.

4. A control circuit according to claim 3, wherein the second upper limit level is set to be higher than the first lower limit level.

5. A control circuit according to claim 3, wherein the first oscillator comprises:
    a first capacitor; and
    a first charging/discharging circuit configured to start discharging when the voltage at the first capacitor reaches the first upper limit level, and to start charging when the voltage at the first capacitor reaches the first lower limit level,
    and wherein the first oscillator is configured to output the voltage at the first capacitor as the first cyclic signal, and to output a synchronization clock having a level that transits according to the state of the charging/discharging circuit being switched between a charging state and a discharging state,
    wherein the second oscillator comprises:
        a second capacitor;
        a frequency divider configured to divide the frequency of the synchronization clock; and
        a second charging/discharging circuit configured to charge and discharge the second capacitor in synchronization with the synchronization clock thus frequency divided,
    and wherein the second oscillator is configured to output the voltage at the second capacitor as the second cyclic signal.

6. A control circuit according to claim 1, wherein the second oscillator is configured to generate the second cyclic signal that has a slope during a period of the first minimum pulse width of the first pulse signal, and that is flat during other periods.

7. A control circuit according to claim 1, wherein the first pulse modulator comprises:
    a comparator configured to compare a current detection signal that corresponds to a current that flows through an inductor included in the switching power supply with the error signal, and to generate a set pulse; and
    an SR flip-flop arranged such that the set pulse is input to its set terminal, and the first cyclic signal is input to its reset terminal, and configured to output the first pulse signal,
    and wherein the first pulse modulator is configured to be capable of clamping the pulse width of the first pulse signal output from the SR flip-flop.

8. A control circuit according to claim 1, wherein the first pulse modulator comprises a first comparator configured to compare the error signal with the first cyclic signal so as to generate the first pulse signal,
    and wherein the first modulator is configured to be capable of clamping the pulse width of the first pulse signal output from the first comparator.

9. A control circuit according to claim 7, wherein the first pulse modulator comprises:
    a first minimum pulse width signal generating unit configured to generate a first minimum pulse width signal having the first frequency and the first minimum pulse width; and
    a logical gate configured to clamp the pulse width of the first pulse signal such that it does not become smaller than the first minimum pulse width, which is a lower limit value, by performing a logical operation on the first pulse signal to be clamped and the first minimum pulse width signal.

10. A control circuit according to claim 8, wherein the first pulse modulator comprises:

a first minimum pulse width signal generating unit configured to generate a first minimum pulse width signal having the first frequency and the first minimum pulse width; and a logical gate configured to clamp the pulse width of the first pulse signal such that it does not become smaller than the first minimum pulse width, which is a lower limit value, by performing a logical operation on the first pulse signal to be clamped and the first minimum pulse width signal.

11. A control circuit for a step-up, a step-down, or otherwise a step-up/step-down switching power supply comprising a switching element, the control circuit comprising:

an error amplifier configured to generate an error signal that corresponds to the difference between a feedback signal which represents an electrical state of the switching power supply and a predetermined reference voltage;

a first oscillator configured to generate a first cyclic signal having a first frequency;

a second oscillator configured to generate a second cyclic signal having a sloping segment and having a second frequency that is lower than the first frequency;

a first pulse modulator configured to generate, based upon a signal that corresponds to the error signal and the first frequency signal, a first pulse signal having the first frequency and having a pulse width that corresponds to the error signal, and to clamp, on a pulse-by-pulse basis, the pulse widths of the pulses included in the first pulse signal such that they do not become smaller than predetermined lower limit values;

a second pulse modulator configured to compare a signal that corresponds to the error signal with the second cyclic signal so as to generate a second pulse signal having a pulse width that corresponds to the error signal;

a synthesizing unit configured to combine the first pulse signal and the second pulse signal so as to generate a driving pulse signal; and a driver configured to drive the switching element according to the driving pulse signal.

12. A control circuit according to claim 11, wherein, of the plurality of pulses of the first pulse signal that are in each period of the second frequency signal, the first pulse modulator is configured to clamp the pulse widths of several pulses thereof such that they do not become smaller than a predetermined first lower limit value, and to clamp the pulse widths of the other pulses thereof such that they do not become smaller than a pulse width that is greater than the first minimum pulse width.

13. A control circuit according to claim 12, wherein, of the plurality of pulses of the first pulse signal that are in each period of the second frequency signal, the first pulse modulator is configured to clamp at least the pulse width of the first pulse thereof such that it does not become smaller than a predetermined lower limit value that is greater than the first minimum pulse width.

14. A control circuit according to claim 11, wherein the first pulse modulator comprises:

a comparator configured to compare a current detection signal that corresponds to a current that flows through an inductor included in the switching power supply with the error signal, and to generate a set pulse; and an SR flip-flop arranged such that the set pulse is input to its set terminal, and the first cyclic signal is input to its reset terminal, and configured to generate the first pulse signal.

15. A control circuit according to claim 11, wherein the first pulse modulator comprises a first comparator configured to compare the error signal with the first cyclic signal so as to generate the first pulse signal.

16. A control circuit according to claim 14, wherein the first pulse modulator further comprises:

a first minimum pulse width signal generating unit configured to generate a first minimum pulse width signal having the first frequency;

a logical gate configured to clamp the pulse width of the first pulse signal by performing a logical operation on the first pulse signal and the first minimum pulse width signal, and wherein the first minimum pulse width signal includes a plurality of pulses in each period of the second cyclic signal, and wherein the pulse widths of several pulses of the plurality of pulses are set to be greater than the first minimum pulse width, and the pulse widths of the other pulses are each set to the first minimum pulse width.

17. A control circuit according to claim 15, wherein the first pulse modulator further comprises:

a first minimum pulse width signal generating unit configured to generate a first minimum pulse width signal having the first frequency;

a logical gate configured to clamp the pulse width of the first pulse signal by performing a logical operation on the first pulse signal and the first minimum pulse width signal, and wherein the first minimum pulse width signal includes a plurality of pulses in each period of the second cyclic signal, and wherein the pulse widths of several pulses of the plurality of pulses are set to be greater than the first minimum pulse width, and the pulse widths of the other pulses are each set to the first minimum pulse width.

18. A control circuit according to claim 1, wherein the synthesizing unit is configured to generate the driving pulse signal by further combining a signal obtained by combining the first pulse signal and the second pulse signal with a third pulse signal having a second minimum pulse width that is smaller than the first minimum pulse width.

19. A control circuit according to claim 11, wherein the synthesizing unit is configured to generate the driving pulse signal by further combining a signal obtained by combining the first pulse signal and the second pulse signal with a third pulse signal having a second minimum pulse width that is smaller than the first minimum pulse width.

20. A switching power supply comprising:
a switching transistor;
an output circuit comprising an inductor element connected to the switching transistor, an output capacitor, and a rectifier element; and
a control circuit according to claim 1, configured to drive the switching transistor.

21. A switching power supply comprising:
a switching transistor;
an output circuit comprising an inductor element connected to the switching transistor, an output capacitor, and a rectifier element; and
a control circuit according to claim 11, configured to drive the switching transistor.

22. An electronic device comprising a switching power supply according to claim 20.

23. An electronic device comprising a switching power supply according to claim 21.

24. A control method for a step-up, step-down, or otherwise a step-up/step-down switching power supply comprising a switching element, the control method comprising:
- generating an error signal that corresponds to the difference between a feedback signal which represents an electrical state of the switching power supply and a predetermined reference voltage;
- generating a first cyclic signal having a first frequency;
- generating a second cyclic signal having a sloping segment and having a second frequency that is lower than the first frequency;
- generating, based upon a signal that corresponds to the error signal and the first frequency signal, a first pulse signal having the first frequency and having a pulse width that corresponds to the error signal, and to clamp the pulse width of the first pulse signal such that it does not become smaller than a predetermined first minimum pulse width which is a lower limit value;
- comparing the signal that corresponds to the error signal with the second cyclic signal so as to generate a second pulse signal having a pulse width that corresponds to the error signal;
- combining the first pulse signal and the second pulse signal so as to generate a driving pulse signal; and
- driving the switching element according to the driving pulse signal.

25. A control method for a step-up, a step-down, or otherwise a step-up/step-down switching power supply comprising a switching element, the control method comprising:
- generating an error signal that corresponds to the difference between a feedback signal which represents an electrical state of the switching power supply and a predetermined reference voltage;
- generating a first cyclic signal having a first frequency;
- generating a second cyclic signal having a sloping segment and having a second frequency that is lower than the first frequency;
- generating, based upon a signal that corresponds to the error signal and the first frequency signal, a first pulse signal having the first frequency and having a pulse width that corresponds to the error signal, and clamping, on a pulse-by-pulse basis, the pulse widths of pulses included in the first pulse signal such that they do not become smaller than predetermined lower limit values;
- comparing a signal that corresponds to the error signal with the second cyclic signal so as to generate a second pulse signal having a pulse width that corresponds to the error signal;
- combining the first pulse signal and the second pulse signal so as to generate a driving pulse signal; and
- driving the switching element according to the driving pulse signal.

26. A control method according to claim 25, wherein, in the aforementioned clamping operation, of the plurality of pulses of the first pulse signal that are in each period of the second frequency signal, the pulse widths of several pulses thereof are clamped such that they do not become smaller than a predetermined first minimum pulse width, which is a lower limit value, and the pulse widths of the other pulses thereof are clamped such that they do not become smaller than a pulse width that is greater than the first minimum pulse width.

27. A control method according to claim 26, wherein, in the aforementioned clamping operation, of the plurality of pulses of the first pulse signal that are in each period of the second frequency signal, at least the pulse width of the first pulse thereof is clamped such that it does not become smaller than a predetermined lower limit value that is greater than the first minimum pulse width.

28. A control circuit for a switching power supply configured to step down or otherwise to boost an input voltage applied to its input terminal, and to output, via its output terminal, an output voltage that is stabilized to a predetermined target value, the control circuit comprising:
- a first switching transistor and a second switching transistor sequentially arranged in series between one terminal of an inductor element included in the switching power supply and a fixed voltage terminal;
- a driving pulse signal generating unit configured to generate a driving pulse signal having a duty ratio that is adjusted such that the output voltage approaches the target value;
- a first driver configured to perform on/off switching of the first switching transistor according to the driving pulse signal; and
- a second driver configured to turn on the second switching transistor during at least a period in which the first switching transistor is on,
- wherein the first switching transistor is configured to have a breakdown voltage that is higher than that of the second switching transistor.

29. A control circuit according to claim 28, wherein the first switching transistor is configured as a soft enhancement mode or depletion mode MOSFET (Metal Oxide Semiconductor Field Effect Transistor).

30. A control circuit according to claim 28, wherein the first driver is configured to turn on the first switching transistor after the second switching transistor is turned on,
- and wherein the second driver is configured to turn off the second switching transistor after the first switching transistor is turned off.

31. A control circuit according to claim 30, wherein the first driver is configured to drive the first switching transistor according to a gate signal of the second switching transistor and the driving pulse signal,
- and wherein the second driver is configured to drive the second switching transistor according to a gate signal of the first switching transistor.

32. A control circuit according to claim 28, wherein the pulse signal generating unit comprises:
- an error amplifier configured to generate an error signal that corresponds to the difference between a feedback signal which represents an electrical state of the switching power supply and a predetermined reference voltage;
- a first oscillator configured to generate a first cyclic signal having a sloping segment and a first frequency;
- a second oscillator configured to generate a second cyclic signal having a sloping segment and a second frequency that is lower than the first frequency;
- a first pulse modulator configured to compare a signal that corresponds to the error signal with the first cyclic signal so as to generate a first pulse signal having a pulse width that corresponds to the error signal, and to clamp the pulse width of the first pulse signal such that it does not become smaller than a predetermined first minimum pulse width;
- a second pulse modulator configured to compare a signal that corresponds to the error signal with the second cyclic signal so as to generate a second pulse signal having a pulse width that corresponds to the error signal; and a synthesizing unit configured to combine the first pulse signal and the second pulse signal so as to generate the driving pulse signal, wherein the first driver is configured to perform switching of the first switching transistor according to the driving pulse signal, and wherein the second driver is configured to perform switching of the second switching transistor according to the second pulse signal.

33. A control circuit according to claim 28, wherein the second driver is configured to perform switching of the second switching transistor according to the driving pulse signal.

34. A control circuit according to claim 25, configured to be monolithically integrated on a single semiconductor substrate.

35. A switching power supply comprising a control circuit according to claim 25.

36. An electronic device comprising a switching power supply according to claim 35.

* * * * *